United States Patent
Heukensfeldt Jansen et al.

(10) Patent No.: US 9,734,603 B2
(45) Date of Patent: *Aug. 15, 2017

(54) SYSTEMS AND METHODS FOR PEAK TRACKING AND GAIN ADJUSTMENT

(71) Applicant: General Electric Company, Schenectady, NY (US)

(72) Inventors: Floribertus P. M. Heukensfeldt Jansen, Niskayuna, NY (US); Mark David Fries, Waukesha, WI (US); Tuoyu Cao, Waukesha, WI (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/282,419

(22) Filed: Sep. 30, 2016

(65) Prior Publication Data
US 2017/0018099 A1 Jan. 19, 2017

Related U.S. Application Data

(63) Continuation-in-part of application No. 14/755,536, filed on Jun. 30, 2015, now Pat. No. 9,508,165.

(51) Int. Cl.
*G06K 9/00* (2006.01)
*G06T 11/00* (2006.01)
*G01T 1/17* (2006.01)
*G01T 1/40* (2006.01)

(52) U.S. Cl.
CPC .............. *G06T 11/008* (2013.01); *G01T 1/17* (2013.01); *G01T 1/40* (2013.01); *G06K 9/0053* (2013.01)

(58) Field of Classification Search
USPC .................................................. 382/162–167
See application file for complete search history.

(56) References Cited

U.S. PATENT DOCUMENTS

| 6,453,068 B1 * | 9/2002 | Li ........................... G06T 5/002 |
| | | 358/1.9 |
| 8,089,037 B2 | 1/2012 | Schmand et al. |
| | | (Continued) |

OTHER PUBLICATIONS

Conti et al.; Monitoring Energy Calibration Drift Using the Scintillator Background Radiation; IEEE Transactions on Nuclear Science; vol. 58, No. 3; Jun. 2011; 8 pages.

*Primary Examiner* — Alex Liew
(74) *Attorney, Agent, or Firm* — Dean D. Small; The Small Patent Law Group, LLC

(57) ABSTRACT

A radiation detection system includes a detector unit and at least one processor. The detector unit is configured to generate signals responsive to radiation. The at least one processor is operably coupled to the detector unit and configured to receive the signals from the detector unit. The at least one processor is configured to obtain, during an imaging process, a first count for at least one of the signals corresponding to a first intrinsic energy window, the first energy window corresponding to values higher than an intrinsic peak value; obtain a second count for the at least one of the signals corresponding to a second intrinsic energy window, the second energy window corresponding to values lower than the intrinsic peak value; and adjust a gain applied to the signals based on at least the first count and the second count.

20 Claims, 9 Drawing Sheets

(56) References Cited

U.S. PATENT DOCUMENTS

| | | | |
|---|---|---|---|
| 8,237,689 B2* | 8/2012 | Nagase | H04N 19/147 345/204 |
| 2002/0012475 A1 | 1/2002 | Li et al. | |
| 2004/0161145 A1* | 8/2004 | Embler | G06T 3/4015 382/165 |
| 2006/0188172 A1* | 8/2006 | Higurashi | G06T 5/006 382/275 |
| 2006/0247695 A1* | 11/2006 | Stalsberg | A61B 5/7203 607/9 |
| 2007/0019860 A1* | 1/2007 | Yoshida | H04N 1/628 382/162 |
| 2010/0065723 A1 | 3/2010 | Burbar et al. | |
| 2011/0049741 A1* | 3/2011 | Brown | B28B 3/20 264/40.1 |
| 2015/0379699 A1 | 12/2015 | Takeuchi et al. | |

* cited by examiner

SYSTEMS AND METHODS FOR PEAK TRACKING AND GAIN ADJUSTMENT

RELATED APPLICATIONS

The present application claims priority to and is a continuation in part of U.S. patent application Ser. No. 14/755,536, filed 30 Jun. 2015, entitled "Systems and Methods for Peak Tracking and Gain Adjustment," the subject matter of which is hereby incorporated by reference in its entirety.

BACKGROUND OF THE INVENTION

The subject matter disclosed herein relates generally to imaging systems and techniques, and more particularly to energy spectrum analysis and gain adjustment.

In certain types of imaging devices, such as positron emission tomography (PET) scanners, arrays of detector elements are used to detect radiation emanating from the patient. In a PET scanner, for example, arrays of scintillator crystals may be used to detect annihilation photons which are generated inside the patient. The annihilation photons are produced when a positron emitted from a radiopharmaceutical injected into the patient collides with an electron causing an annihilation event. The scintillator crystals receive the annihilation photons and generate light photons in response to the annihilation photons, with the light photons detected by a photosensor configured to convert the light energy from the light photons to electrical energy used to reconstruct an image.

Detector behavior (e.g., detector gain), however, may vary over time. Detector gain depends, among other things, on the temperature of various components as well as a bias voltage applied to a silicon photomultiplier (SiPM). As the detector gain varies, the energy peak for detected events varies, reducing accuracy. Conventionally, peak stability as a function of temperature may be controlled using a thermal monitoring system, and used to adjust the gain based on the temperature. Such approaches work to an extent, but may not provide a desired level of peak stability or accuracy of gain adjustment. Peak instability may be a particular concern in PET systems used in conjunction with magnetic resonance imaging (MRI), as activation of gradient coils of an MRI system may result in relatively larger and/or quick increases in temperature.

BRIEF DESCRIPTION OF THE INVENTION

In accordance with various embodiments, a radiation (e.g., positron emission tomography (PET)) detection system that includes a detector unit and at least one processor is provided. The detector unit is configured to generate signals responsive to radiation. The at least one processor is operably coupled to the detector unit and configured to receive the signals from the detector unit. The at least one processor is configured to obtain a first count for at least one of the signals corresponding to a first intrinsic energy window, the first energy window corresponding to values higher than an intrinsic peak value; obtain a second count for the at least one of the signals corresponding to a second intrinsic energy window, the second energy window corresponding to values lower than the intrinsic peak value; and adjust a gain applied to the signals based on the first count and the second count. As used herein, intrinsic energy may be understood as energy that is not received from an object being imaged. For example, intrinsic energy may be due to radioactivity within a detector crystal. As another example, in some embodiments, intrinsic energy may be provided from another source (other than the object being imaged).

In accordance with various embodiments, a method is provided that includes generating signals, with a detector unit, responsive to radiation. The method also includes obtaining, with at least one processor, a first count for at least one of the signals corresponding to a first intrinsic energy window, with the first energy window corresponding to values higher than an intrinsic peak value. The method also includes obtaining, with the at least one processor, a second count for the at least one of the signals corresponding to a second intrinsic energy window, with the second energy window corresponding to values lower than the intrinsic peak value. Further, the method includes adjusting a gain applied to the signals based on the first count and the second count.

In accordance with various embodiments, a tangible and non-transitory computer readable medium is provided that includes one or more software modules. The one or more software modules are configured to direct one or more processors to generate signals, with a detector unit, responsive to radiation; obtain, a first count for at least one of the signals corresponding to a first intrinsic energy window, the first energy window corresponding to values higher than an intrinsic peak value; obtain a second count for the at least one of the signals corresponding to a second intrinsic energy window, the second energy window corresponding to values lower than the intrinsic peak value; and adjust a gain applied to the signals based on the first count and the second count.

DETAILED DESCRIPTION OF THE INVENTION

Figure 1:
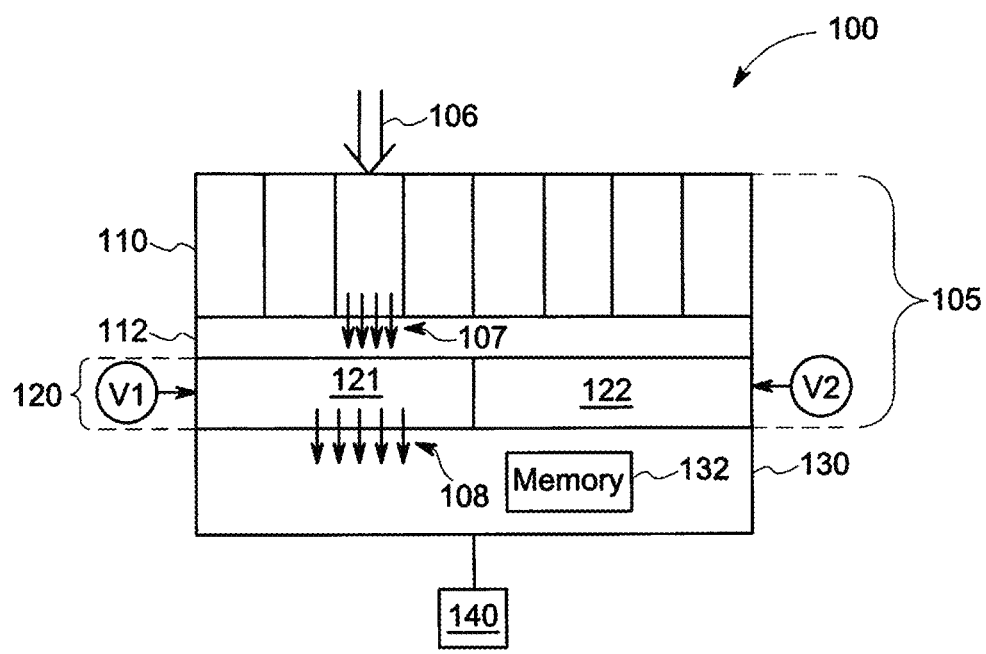
FIG. 1 is a schematic diagram of a PET detection system in accordance with various embodiments.

The following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or random access memory, hard disk, or the like) or multiple pieces of hardware. Similarly, the programs may be stand-alone programs, may be incorporated as subroutines in an operating system, may be functions in an installed software package, may be implemented in hardware or firmware, and the like. It should be understood that the various embodiments are not limited to the arrangements and instrumentality shown in the drawings.

As used herein, the terms "system," "unit," and "module" include a hardware and/or software system that operates to perform one or more functions. For example, a system, unit, or module may include electronic circuitry that includes and/or is coupled to one or more computer processors, controllers, or other logic based devices that perform operations based on instructions stored on a tangible and non-transitory computer readable storage medium, such as a computer memory. Alternatively or additionally, a system, unit, or module may include a hard-wired device that performs operations based on hard-wired logic of the device. The systems, units, or modules shown in the attached figures may represent the hardware that operates based on software or hardwired instructions, the software that directs hardware to perform the operations, or a combination thereof. "Systems," "units," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described herein. Additionally or alternatively, one or more of these devices may be hard-wired with logic circuits to perform these operations. Further, "systems," "units," or "modules" may be configured to execute one or more algorithms to perform functions or operations described herein. The one or more algorithms may include aspects of embodiments disclosed herein, whether or not expressly identified in a flowchart or as a step of a method.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments provide PET photosensor and/or PET detector systems with improved gain stability. In various embodiments, singles events may be examined at the detector front end, in multiple energy windows including windows near the peak, to detect small peak shifts accurately. The energy windows may be fixed or scalable. By counting singles events that fall into each window, it may be determined if the peak has shifted from a nominal or target peak value (e.g., 511 keV for annihilation photons). If the peak differs from the target peak by more than a predetermined amount (in some embodiments, the predetermined amount may be fixed, while in others the predetermined amount may be scalable), the gain of a corresponding photodetector device may be appropriately adjusted.

Various embodiments may be implemented in programmable hardware on a detector board, with the window sizes and gain transfer function represented by configurable logic (e.g., registers, state machines, mathematical functions). Alternatively, firmware that executes on a detector acquisition board may sample energy peak locations of single event data and perform similar window counting and gain transfer functions.

In various embodiments, 3 or more windows are used to analyze signals (e.g., as represented by histograms sorted by energy level). For instance, in an example embodiment having a target or nominal peak value of 511 keV, four windows may be used in for each detection unit of a PET system—a scatter window (having energy levels between 460-480 keV), a lower window (having energy levels between 480-510 keV), an upper window (having energy levels between 512-542 keV), and a background window (having energy levels between 542-562 keV).

For the example embodiment, the energy of singles events processed are first corrected or adjusted based on known or expected gains, such as by using a lookup table based on the crystal location. The energy is then compared to the energy windows and used to increment the appropriate counter for events that fall within one of the windows. As the window counters are incremented, a running total may be obtained that is equal to $WU-WL+A*WS-B*WB$, where the running total is a peak tracking metric, WU is the number of counts for the upper window, WL is the number of counts for the lower window, WS is the number of counts in the scatter window, WB is the number of counts in the background window, and A and B are scaling or weighting factors applied to the scatter counts and the background counts, respectively. The values of A and B may be experimentally determined during a calibration process (e.g., a calibration of a representative model of detector unit, with the experimentally determined values utilized for detector units having the same components and configuration). In some embodiments, a gain transfer function may be implemented by determining when the running total reaches a threshold, for example 200, and defining another counter (e.g., a voltage offset counter) that is then incremented or decremented (depending on whether the running total difference is positive or negative). It may be noted that, in some embodiments, a conventional thermal update gain algorithm may be run with peak tracking, and any gain update determined using peak tracking may be foregone if there is to be an adjustment based on thermal drift, for example to help eliminate or reduce overshoot. It may be noted that additional or alternative windows and weighting factors may be used for isotopes that introduce additional peaks and shape in an energy spectrum (also known as "dirty isotopes").

Accordingly, various embodiments improve peak stability by providing improved accuracy and reliability in gain adjustment (e.g., to help address environmental changes, such as increases or decreases in temperature, or changes in the supply voltage). By improving peak stability, tighter energy windows may be used in identifying singles events for a high precision mode of operation that gives greater noise equivalent count rate (NECR) capability, lower scatter fraction, and so better image quality, while being more quantitative than certain current approaches.

A technical effect of at least some embodiments provides improved detector performance. For example, a technical effect of at least some embodiments includes improved accuracy of gain adjustment and peak stability. As another example, a technical effect of at least some embodiments provides improved detector count rate linearity. A technical effect of at least some embodiments provides improved signal to noise ratio in patient images (e.g., by reducing the effects of scatter). A technical effect of at least some embodiments provides improved quantitative accuracy (e.g., due to reduced peak drift).

FIG. 1 provides a schematic diagram of a radiation detection system 100 (e.g., PET detection system 100) formed in accordance with various embodiments. The depicted PET detection system 100 includes a detector unit 105 and a processing unit 130. It may be noted that one or more aspects of the detector unit 105 and the processing unit 130 may be integrally formed or otherwise disposed in a common housing. For example, photosensors of the detector unit 105 and aspects of the processing circuitry of the processing unit may be disposed on a common chip. Additionally or alternatively, aspects of the processing unit 130 may be part of an FPGA or ASIC that is mounted to the detector unit 105 and communicably coupled to the detector unit 105. Generally, the PET detection system 100 is configured to receive a photon or gamma ray, and provide an output (e.g., signals 108) indicative of the energy of the gamma ray, the location of impact of the gamma ray, and the timing of the impact of the gamma ray to a reconstruction processing unit 140 that is disposed off-board of the detector unit 105. The reconstruction processing unit may then use the information from the PET detection system 100 and other generally similar PET detection systems disposed about an object to be imaged to reconstruct an image of at least a portion of the object to be imaged. It may be noted that, in various embodiments, one or more aspects of the processing unit 130 may be disposed on the off-board reconstruction processing unit 140. It may further be noted that the PET detection system is one example of a radiation detection system, and the other types of detection systems may be utilized in various embodiments. For example, in some embodiment, a direct conversion radiation detection system or detection system utilizing direct conversion devices may be employed.

The depicted detector unit 105 includes a crystal array 110, a light guide 112, and a photosensor unit 120. Generally, an annihilation photon 106 impacts the crystal array 110, and the crystal array generates light photons 107 responsive to the annihilation photon 106. The light photons 107 impact the photosensor unit 120, which provides signals 108 corresponding to the reception of the light photons 107. Signals 108 corresponding to annihilation photon or gamma ray impact on the various crystals may be used to determine the energy and location of impacts, which may be used to reconstruct the image. It may be noted that each photon impact may also be referred to as a radiation event. For example, a given annihilation photon impact may be a singles event. Two opposed singles events on a common line of response within a predetermined time range of each other may be determined to correspond to a coincidence event, with the coincidence events used to reconstruct an image.

The depicted crystal array 110 is configured to be impacted by gamma rays or photons during a PET scan and to produce light in response to being impacted by gamma rays or photons. The crystal array 110 is an example of a scintillator block that produces light in response to the impact of gamma rays or photons. The light may be detected by an associated photosensor (e.g. Silicon photomultiplier (SiPM)) and used to reconstruct an image. The crystal array 110 may be formed, for example, from a group of crystals, with one or more internal light barriers between groups of crystals. For ease of illustration and clarity of description, it may be noted that only one crystal array 110 and only one PET detection system 100 are shown in FIG. 1. It may be noted that, in practice, multiple generally similar PET detection systems 100 may be disposed about an object being imaged (e.g., in a ring), with photons from a given annihilation event striking opposite crystal arrays or detection systems 100. The particular numbers and/or arrangement of detections systems, crystals, and photosensors (and/or photosensor regions) for the various embodiments depicted and/or discussed herein are provided by way of example. Other numbers and/or arrangements may be employed in various embodiments.

Figure 2:
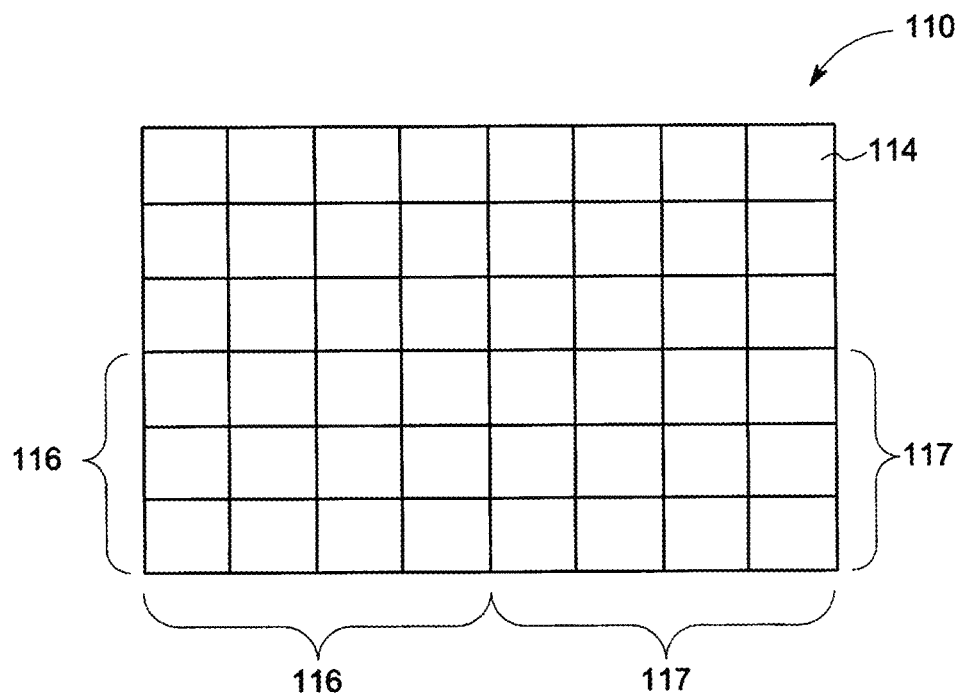
FIG. 2 is a plan view of a crystal array of the PET detection system of FIG. 1.

As best seen in FIG. 2, the depicted crystal array 110 includes a number of crystals 114 arranged in sub-arrays. In the illustrated embodiment, sub-array 116 includes a 3×4 group of crystals or blocks, and sub-array 117 includes a different 3×4 group of crystals or blocks. Different numbers of crystals may be arranged into sub-arrays in various embodiments. In some embodiments, each sub-array of the crystal array 110 has a dedicated or corresponding photosensor region of the photosensor unit 120 assigned thereto. Accordingly, light from each sub-array may be independently detected or identified. Further, each photosensor region may have an independently adjustable voltage supplied thereto. Accordingly, the voltage and/or gain associated with a given corresponding photosensor and sub-array may be adjusted independently of the voltage and/or gain of other photosensor/sub-array combinations.

The light guide 112 is disposed between the crystal array 110 and the photosensor unit 120. The light guide 112 is configured to direct light from the crystal array 110 (e.g., light generated in response to the impact of annihilation photons on the crystal array 110) to the photosensor unit 120. The light guide 112, for example, may be made of plastic or glass. Generally, the light guide 112 may be configured to have a refractive index that is close to the refractive index of the crystal array 110 or close to the refractive index of the photosensor unit 120 to help in the transfer of light from the crystal array 110 to the photosensor unit 120. In some embodiments in which the photosensor unit 120 is directly coupled to the crystal array 110, optical epoxy may be utilized without a lightguide. In some embodiments, the light guide 112 may be beveled (e.g., has a larger cross-section proximate to the crystal array 110 than proximate to the photosensor unit 120). Thus, the area and/or number of photosensors may be reduced, thereby reducing the cost, capacitance, and noise (dark current).

The depicted photosensor unit 120 is configured to receive, via the light guide 112, light generated by the crystal array 110, and to provide an electrical charge or output (e.g., one or more signals 108 to the processing unit 130) responsive to the received light. The photosensor unit 120 of the illustrated embodiment includes a first photosensor region 121, and a second photosensor region 122. Additional photosensor regions may be employed in various embodiments. Each photosensor region may correspond to or be dedicated to one or more sub-arrays of the crystal array 110. For example, the first photosensor region 121 may correspond to the sub-array 116, and the second photosensor region 122 may correspond to the sub-array 117. Each photosensor region may have an independently adjustable voltage provided thereto, so that the gain associated with each photosensor (and associated portions of the crystal array 110) may be independently adjusted.

In various embodiments, each photosensor region is separated from the other photosensor regions by light barriers. Each photosensor region may be operably coupled to a corresponding regional circuit portion and provide an output to the corresponding regional circuit portion. In some embodiments, the photosensor regions each include plural photosensor units. The number of photosensor units in some embodiments may correspond to the number of crystal elements in a corresponding sub-array, while in other embodiments the numbers may differ. It may be noted that other numbers and/or arrangements of photosensor regions and/or crystal portions may be used in various embodiments. In some embodiments, each photosensor region may have only a single photosensor unit associated therewith.

Generally, each photosensor region provides an independent output (e.g., independent of other photosensor regions) signal (or signals) unique to that region and corresponding to the impact of gamma rays or photons on a portion of the crystal array associated with the particular region. It may be noted that a given gamma ray may result in an output from more than one photosensor region, for example due to Compton scattering. In various embodiments, photosensor regions may be formed from one or more vacuum photomultipliers, avalanche photodiodes, or silicon photomultipliers. Each photosensor region, for example, may be configured as a separate semiconductor in some embodiments, while, in other embodiments, multiple photosensor regions may be present on a single semiconductor. In various embodiments, a photosensor output circuit may be disposed on one or more unit that is separate from the photosensor regions (e.g., integrated chip (IC) such as application specific integrated chip (ASIC)). In other embodiments, at least a portion of a photosensor output circuit may be disposed on a semiconductor such as a complementary metal oxide semiconductor (CMOS) on which one or more photosensor regions are disposed. In some embodiments, a portion of the photosensor output circuit may be disposed on a CMOS and another portion on an ASIC (e.g., regional circuits disposed on CMOS and summing circuit disposed on ASIC).

Returning to FIG. 1, in the illustrated embodiment, the processing unit 130 is operably coupled separately to the detector unit 105. The depicted processing unit 130 is configured (e.g., may include one or more ASIC's and/or FPGA's, and/or includes or is associated with a tangible and non-transitory memory having stored thereon instructions configured to direct the processor) to obtain a first count for at least one signal 108 that corresponds to a first energy window, with the first energy window corresponding to values higher than a nominal peak value. For example, for annihilation photons produced during a PET scan, the photons may have a nominal peak value of 511 keV. The first energy window may then be placed higher than the nominal peak value. For example, a minimum energy for the first energy window may be slightly more than the nominal peak value. Portions of the signals 108 that correspond to counts within the first energy window over a predetermined amount of time may be used to obtain the first count. The processing unit 130 of illustrated embodiment is also configured to obtain a second count for at least one signal that corresponds to a second energy window, with the second energy window corresponding to values lower than a nominal peak value. Again, for photons produced during a PET scan, the photons may have a nominal peak value of 511 keV. The second energy window may then be placed lower than the nominal peak value. For example, a maximum energy for the second energy window may be slightly less than the nominal peak value. Portions of the signals 108 that correspond to counts within the second energy window over a predetermined amount of time may be used to obtain the second count.

The depicted processing unit 130 is also configured to obtain at least one auxiliary count for the at least one signal, with the at least one auxiliary count corresponding to at least one auxiliary window. In various embodiments, an auxiliary window may be disposed between energy levels that are lower than the energy levels of the second window, for example to correspond to portions of a signal caused by scatter. Alternatively or additionally, an auxiliary window may be disposed between energy levels that are higher than the energy levels of the first window, for example to correspond to portions of a signal caused by pileup. As another example, an auxiliary window may be disposed between energy levels that are higher than the energy levels of the first window, for example to correspond to portions of a signal caused by intrinsics (e.g., counts generated by intrinsic radioactivity from within the crystal array 110, or by radiation from an external source that provides radiation of known energy for calibration purposes). (For additional discussion regarding the use of energy windows and the locations of energy windows, see, for example, FIGS. 4-5 and related discussion). It may be noted that, in some embodiments, intrinsic rate may be relatively constant, and intrinsics may be subtracted out from a signal instead of using an intrinsic window. In the illustrated embodiment, the processing unit 130 is further configured to adjust a gain applied to signals based on the first count, the second count, and the auxiliary count. For example, the first count, second count, and auxiliary count may be used to track a peak of the signals. If the peak of the signals differs from the nominal peak (e.g., 511 keV) or differs from the nominal peak more than a threshold tolerance level, the gain may be adjusted to bring the peak to or nearer to the nominal peak value. Thus, if the determined peak is below (or far enough below) the nominal value, the gain (e.g., voltage applied to a photosensor region providing the signals being tracked) may be increased. However, if the determined peak is above (or far enough above) the nominal value, the gain may be decreased. If the determined peak is at the nominal value or within an acceptable range of the nominal value, the gain may not be adjusted. Accordingly, various embodiments may be understood as tracking the peak directly, instead of using other compensation techniques based on indirect measures of peak such as temperature change, providing improved accuracy. Gain adjustment may be provided for example by changing the gain of the photosensor (for example by changing the bias voltage), by changing the gain of an amplifier (for example, a voltage controlled amplifier or VCA), or by multiplying a digital representation of the energy by a factor that represents the gain adjustment (which may be referred to herein as a virtual gain adjustment). Further, use of one or more auxiliary windows in various embodiments provides improved accuracy over using only two windows.

In various embodiments the processing unit 130 includes processing circuitry configured to perform one or more tasks, functions, or steps discussed herein. It may be noted that "processing unit" as used herein is not intended to necessarily be limited to a single processor or computer. For example, the processing unit 130 may include multiple processors, ASIC's, FPGA's, and/or computers, which may be integrated in a common housing or unit, or which may distributed among various units or housings. It may be noted that operations performed by the processing unit 130 (e.g., operations corresponding to process flows or methods discussed herein, or aspects thereof) may be sufficiently complex that the operations may not be performed by a human being within a reasonable time period. For example, the determination of energy values of various signals and obtaining the counts, as well as tracking the peak and/or adjusting the gain based on the obtained counts, may rely on or utilize computations that may not be completed by a person within a reasonable time period.

In the illustrated embodiment, the processing unit 130 is disposed onboard the detector unit 105. It may be noted that other types, numbers, or combinations of modules or portions may be employed in alternate embodiments, and/or various aspects of modules or portions described herein may be utilized in connection with different modules or portions additionally or alternatively. Generally, the various aspects of the processing unit 130 act individually or cooperatively with other aspects to perform one or more aspects of the methods, steps, or processes discussed herein.

As seen in FIG. 1, the processing unit includes a memory 132. The memory 132 may include one or more computer readable storage media (e.g., tangible and non-transitory storage media). The memory 132, for example, may store information corresponding to the energy values of one or more signals, count information for the obtained counts, results of intermediate processing steps, calibration parameters, or the like. For example, the memory 132 may have stored thereon one or more formulae or look-up tables that may be utilized to determine if the obtained counts correspond to a target or nominal energy peak. Further, the process flows and/or flowcharts discussed herein (or aspects thereof) may represent one or more sets of instructions that are stored in the memory 132 for direction of operations of the PET detection system 100.

It may be noted that, in various embodiments, one or more aspects of the processing unit 130 may be shared with the detector unit 105, associated with the detector unit 105, and/or disposed onboard the detector unit 105. For example, in some embodiments, at least a portion of the processing unit 130 is integrated with the detector unit 105. In various embodiments, at least a portion of the processing unit 130 includes at least one application specific integrated circuit (ASIC) or field programmable gate array (FPGA) that is disposed onboard or integrated with the detector unit 105.

Figure 3A:
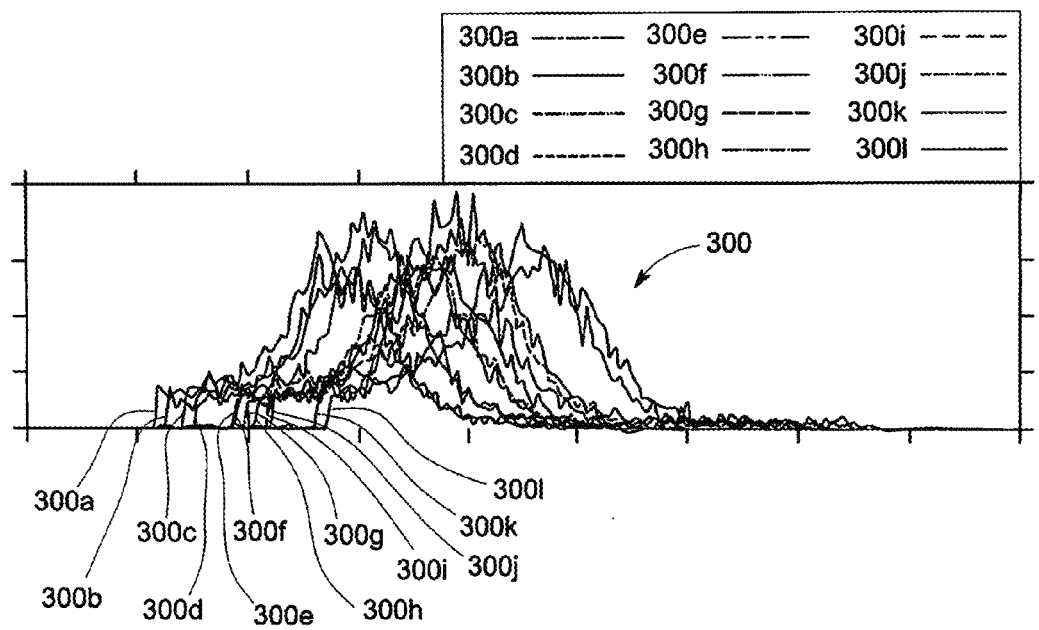
FIG. 3A depicts histograms corresponding to signals from elements of a crystal array in accordance with various embodiments.
Figure 3B:
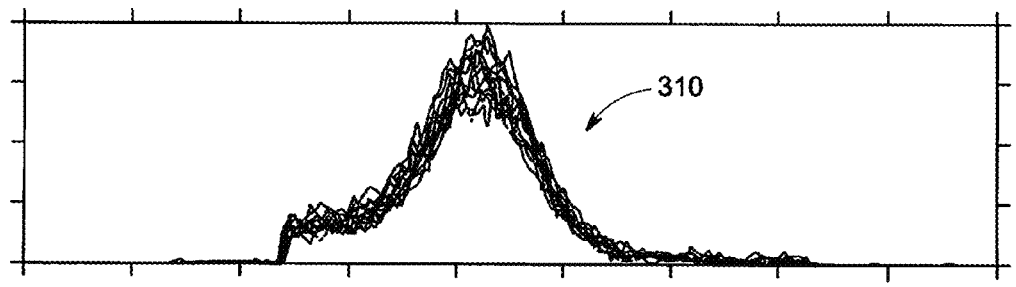
FIG. 3B depicts scaled histograms using the histograms of FIG. 3A.
Figure 3C:
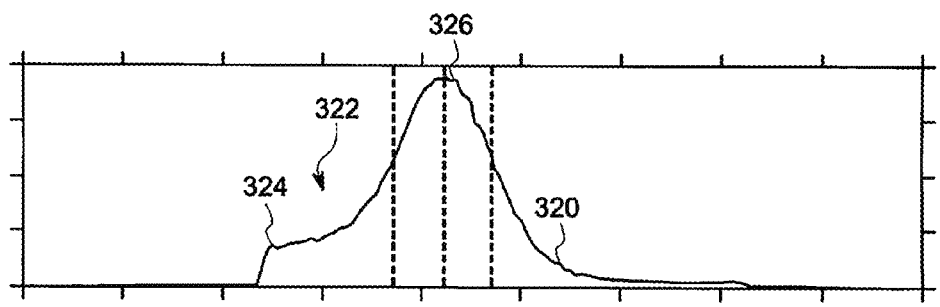
FIG. 3C depicts a combined histogram using the scaled histograms of FIG. 3B.

When obtaining the counts, multiple signals may be joined or combined to form an evaluation signal from which the counts for the various windows are obtained. For example, for a photosensor region that is dedicated to a 3×4 sub-array of crystals, there are 12 total elements or blocks of the sub-array. One or more signals from each of the elements or blocks may be combined with the signals from other elements or blocks to form a combined signal which is evaluated to obtain the counts, as far as they show the same temperature dependence or peak shift trend. FIGS. 3A, 3B, and 3C depict various aspects of combining signals to provide an evaluation signal in accordance with various embodiments.

For example, FIG. 3A depicts individual signals or histograms 300 (namely 300a, 300b, 300c, 300d, 300e, 300f, 300g, 300h, 300i, 300j, 300k, 300l) corresponding to signals measured responsive to radiation impacting the crystals of a sub-array. Each individual histogram 300 is a histogram for a particular crystal of the sub-array in the measured electrical signal size or ADC bin (analog-to-digital converted binary). With a total of 12 crystals in the sub-array for the depicted embodiment, 12 individual histograms are utilized. The peaks in a histogram represent 511 keV energy gamma rays even though they are different in ADC bin. The individual histograms 300 may then be scaled, to provide the scaled histograms 310 (e.g., scaled to 511 keV) depicted in FIG. 3B. It may be noted that a difference between the histograms of FIG. 3A and FIG. 3B is that the former is in a scale of a measured signal bin (e.g., ADC bin) and the latter is in a scale of a gamma ray energy bin. For a given 511 keV gamma ray energy deposition, the peaks may be expected to be the same, but the peaks differ in practice because of differences in crystal output, optical coupling, and/or other factors. However, because it is known that the peak represents 511 keV in the case of annihilation photons, a gain conversion factor may be calculated so the spectrum may be re-scaled to be in a keV bin. For example, each crystal may have a particular value or relationship, determined during a calibration procedure, that is configured to scale a measured value closer to an ideal or expected gamma energy value. The particular values or relationships may be stored as part of a system calibration file. The scaled histograms 310 of FIG. 3B may then be combined into a single histogram 320, as seen in FIG. 3C. The various counts for the windows as discussed herein may be determined using the combined histogram 320 to determine whether a gain adjustment should be applied to the sub-array (e.g., to the photosensor region corresponding to the sub-array). It may be noted that the combined histogram 320 of the depicted embodiment is not symmetric about the peak. Instead, for example, a portion 322 corresponding to scatter may provide a plateau of detected radiation 324 with energies lower than the peak 326. Because scatter may affect the peak location, using merely two windows (e.g., an upper and a lower) may not capture the effect of scatter on the peak. Accordingly, in various embodiments, three or more windows may be employed to more accurately track the peak of the energy histogram.

Figure 4:
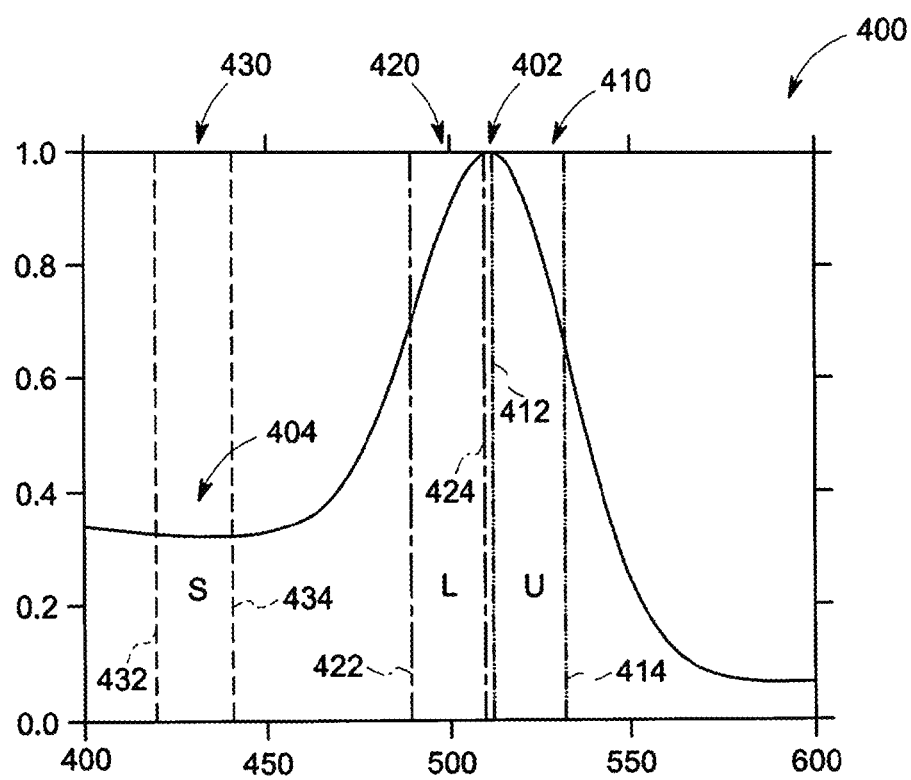
FIG. 4 depicts example windows used in connection with various embodiments.

FIG. 4 depicts example windows used in connection with various embodiments. In the example of FIG. 4, three windows are shown. In FIG. 4, a histogram 400 (sorted by energy level) is illustrated. The histogram 400, for example, may be generated as described in connection with FIG. 3. As seen in FIG. 4, the histogram 400 includes a peak 402 located at about 511 keV. The histogram 400 also includes a portion 404 corresponding to an elevated number of counts (relative to an ideal, symmetric histogram not affected by scatter). In the illustrated embodiment, three windows are depicted: a first window 410 (or upper window), a second window 420 (or lower window), and an auxiliary window 430 (or scatter window).

The first window 410 has a minimum boundary 412 and a maximum boundary 414 that are both higher than the nominal peak 402. The first window 410 accordingly corresponds to values higher than the nominal peak 402. The second window 420 has a minimum boundary 422 and a maximum boundary 424 that are both lower than the nominal peak 402. The second window 420 accordingly corresponds to values lower than the nominal peak 402. The first and second windows are both positioned to have one boundary (the maximum boundary 424 for the second window 420 and the minimum boundary 412 for the first window 410) at or near the nominal peak 402. The auxiliary window 430 has a minimum boundary 432 and a maximum boundary 434 that are both lower than the nominal peak 402, as well as lower than the minimum boundary 422 of the second window 420. It may be noted that in some embodiments, for example, the maximum boundary may not be lower than the nominal peak 402. In the illustrated embodiment, the auxiliary window 430 corresponds to energy values corresponding to or associated with scatter. The particular values that correspond to or are associated with scatter may vary by application (e.g., detector composition or architecture, or radiopharmaceutical(s) used in connection with PET scan, among others).

As indicated herein, the counts corresponding to the windows 410, 420, 430 may be used to determine whether or not a gain applied to signals provided by a detector unit is to be adjusted. For example, the counts may be used to determine a measured peak, and it may be determined if the measured peak is at or within a tolerable distance of the nominal peak. If the measured peak is below the nominal peak, the gain may be increased, or if the measured peak is above the nominal peak, the gain may be decreased.

In various embodiments, a peak tracking metric may be employed. For example, for the embodiment depicted in FIG. 4, a peak tracking metric may be defined as M=U−(L−A*S), where M is the peak tracking metric, U is the number of counts in the first window 410, L is the number of counts in the second window 420, S is the number of counts in the auxiliary window 430, and A is a weighting coefficient for the auxiliary counts. For example, A may be more than zero but less than one. It may be noted that A in some embodiments may be more than one (e.g., for a relatively narrow window). The higher A is, the more impact the counts in the auxiliary window 430 have on the metric, while the lower A is, the less impact the counts in the auxiliary window 430 have on the metric. In the illustrated embodiment, if M is less than zero, it is determined that the peak is below the nominal peak and the gain may be increased, while, if M is greater than zero, it is determined that the peak is above the nominal peak and the gain may be increased. In some embodiments, an acceptable or tolerable range of M may be predetermined, and the gain increased when the value of M is outside of and below the tolerable range, with the gain decreased when the value of M is outside of and above the tolerable range. The particular value of A, as well as the sizes (e.g., energy ranges) and locations of the windows may be determined during a testing or calibration process of a detector unit. For example, the detector unit may be provided with a known amount of radiation over varying conditions (e.g., temperature changes and degree of scatter), and the particular values of A and the window sizes/locations determined experimentally. The value of M may be incremented or otherwise updated periodically and maintained on a running basis. In some embodiments, M may be periodically evaluated and a counter incremented (or decremented) when M for the most recent evaluation period is positive (or negative).

The example depicted in FIG. 4 utilizes a single auxiliary window; however, in other embodiments, two or more auxiliary windows may be employed. The number, size, and location of auxiliary windows may vary by application. For example, more windows may be used in embodiments for which increased accuracy is desired and/or for which the effects of asymmetry on the histogram more heavily impact the peak location.

Figure 5:
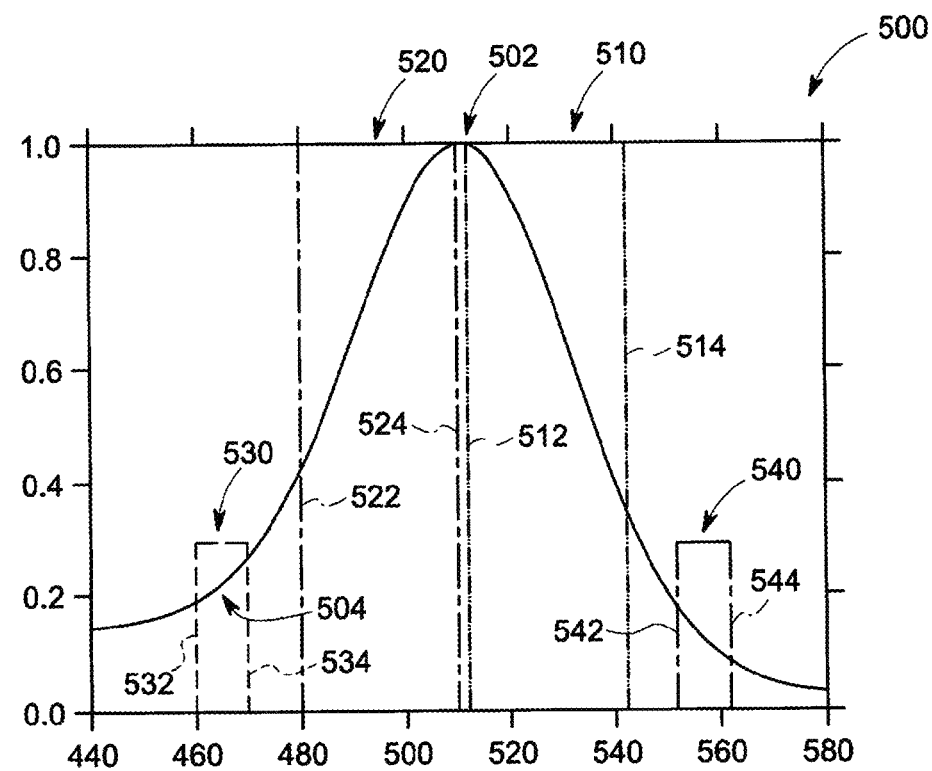
FIG. 5 depicts example windows used in connection with various embodiments.

FIG. 5 depicts example windows used in connection with various embodiments. In the example of FIG. 5, four windows are shown. In FIG. 5, a histogram 500 (by energy level) is illustrated. The histogram 500, for example, may be generated as described in connection with FIG. 3. The example of FIG. 5 may be similar to the example of FIG. 4 in certain respects. For example, as seen in FIG. 5, histogram 500 includes a peak 502 located at about 511 keV.

The histogram 500 also includes a portion 504 corresponding to an elevated number of counts (relative to an ideal, symmetric histogram not affected by scatter). In the example depicted in FIG. 5, a first window 510 (or upper window), a second window 520 (or lower window), and an auxiliary window 530 (or scatter window) generally similar to the windows depicted in FIG. 4 are also shown. The example of FIG. 5, however, also includes a second auxiliary window 540. The second auxiliary window 540 is disposed at energies above the first window 510, and may correspond to energies, for example, for pile-up and/or other intrinsics (e.g., events generated by radiation from within a detector unit in contrast to events from received annihilation photons).

Generally, in various embodiments, the number and location of auxiliary windows may be selected to address counts attributable to various causes. As discussed herein, for example, counts attributable to scatter may affect the symmetry of the histogram and the peak location. As another example, counts attributable to intrinsic radiation (e.g., events from a crystal array or other scintillator itself) may affect the symmetry of the histogram and the peak location. As another example, counts attributable to pile-up may affect the symmetry of the histogram and peak location. Counts attributable to pile-up may increase with count rate. Accordingly, the weight of a variable associated with a pile-up window (and/or other windows) may be adjusted based on count rate. As one more example, counts related to dirty isotopes may affect the symmetry of the histogram and peak location. Accordingly, in some embodiments, the processing unit 130 may be configured to vary values for the weights used to determine a peak tracking metric based on type of radiopharmaceutical administered to an object to be imaged. For example, an auxiliary window corresponding to energy values for dirty isotopes may be employed for a first radiopharmaceutical, but the auxiliary window for dirty isotopes may not be employed when a second radiopharmaceutical that is free of extraneous energy peaks is utilized. Alternatively, the pile-up window may be used for a pharmaceutical that is free of extraneous energy peaks, but not for an isotope such as I-124 which has a strong emission at 602 keV.

Similar to the example of FIG. 4, the first window 510 has a minimum boundary 512 and a maximum boundary 514 that are both higher than the nominal peak 502. Also, the second window 520 has a minimum boundary 522 and a maximum boundary 524 that are both lower than the nominal peak 502. As with the example of FIG. 4, the first and second windows are both positioned to have one boundary (the maximum boundary 524 for the second window 520 and the minimum boundary 512 for the first window 510) at or near the nominal peak 502.

In the example depicted in FIG. 5, however, two auxiliary windows are used, namely, a first auxiliary window 530 and a second auxiliary window 540. The first auxiliary window 530 may be generally similar to the first auxiliary window 430 in respects. For example, the auxiliary window 530 has a minimum boundary 532 and a maximum boundary 534 that are both lower than the nominal peak 502, as well as lower than the minimum boundary 522 of the second window 520. In the illustrated embodiment, the first auxiliary window 530 corresponds to energy values corresponding to or associated with scatter.

As seen in FIG. 5, the second auxiliary window 540 has a minimum boundary 542 and a maximum boundary 544 that are both higher than the nominal peak 502, as well as higher than the maximum boundary 514 of the first window

510. In the illustrated embodiment, the second auxiliary window 540 corresponds to energy values corresponding to or associated with intrinsic radiation. Additionally or alternatively, the second auxiliary window 540 in various embodiments may correspond to energy values corresponding to or associated with pile-up. In the illustrated embodiment, the windows do not overlap. It may be noted that, in some embodiments, windows may overlap.

As with the example discussed in connection with FIG. 4, a peak tracking metric may be employed for the example discussed in FIG. 5. For example, for the embodiment depicted in FIG. 5, a peak tracking metric may be defined as $M=U-L-A*(A1+A2)-B*(A1-A2)$, where M is the peak tracking metric, U is the number of counts in the first window 510, L is the number of counts in the second window 520, A1 is the number of counts in the first auxiliary window 530, A2 is the number of counts in the second auxiliary window 540, and A and B are weighting coefficients for the auxiliary counts. It may be noted that in some embodiments a running total for a peak tracking metric may be maintained, with the running total used to determine adjustments to the gain. In some embodiments, a peak tracking metric based on the total counts for each window over a predetermined time interval may be sampled and used to periodically adjust the gain at predetermined intervals. It may be noted that, in some embodiments, a running accumulator may be updated with weighted new events, with each event being weighted individually right when it happens (based on the corresponding window) and added to the running accumulator.

Additional and/or alternative windows, weighting factors, and/or metrics may be employed in various embodiments. Generally, in various embodiments, a peak tracking metric may be employed that uses corresponding weights for a given number of windows (e.g., a first window for values in a range above a nominal peak, a second window for values in a range below the nominal peak, and one or more auxiliary windows). The peak tracking metric may be determined by applying at least one corresponding weight to at least one of the first count, the second count, and at least one auxiliary count. In various embodiments, the weights may only be used to modify the count values for auxiliary windows. Next, it may be determined if the peak tracking metric is within a predetermined range corresponding to the nominal peak for a given number of received counts. In some embodiments, a metric value of zero corresponds to the peak being at the value of the nominal peak, a positive value indicates a peak above the nominal value, and a negative value indicated a peak below the nominal value. In various embodiments, a peak tracking metric may be maintained on a running basis and incremented or decremented based on counts received, with the gain adjusted when the running total exceeds a threshold. In various embodiments, the gain may be increased if the peak tracking metric is lower than the predetermined range, or decreased if the peak tracking metric is higher than the predetermined range. It may be noted that alternative or additional techniques may be employed to determine a peak location and/or a peak tracking metric. For example, in some embodiments, intrinsics, if known, may be subtracted out when preparing a histogram from which to obtain window counts. For example, with a nominal peak value of 511 keV, all readings above 700 keV may be subtracted out in some embodiments. As another example, in some embodiments, a value for the peak may be determined and compared directly to a nominal or desired peak value in order to determine whether a gain is to be adjusted, and if so, by how much.

As noted herein, the gain associated with a particular photosensor portion or region (as well as corresponding crystal element or group of elements such as a sub-array), may be adjusted. For example, in some embodiments, the gain may be adjusted (e.g., under the control of the processing unit 130) by varying a voltage applied to the detector unit 105. The voltage may be varied by a predetermined step, irrespective of the distance from the predetermined range or target for a peak tracking metric. For example, as long as the metric is below the predetermined range, a predetermined positive step may be added to the voltage in some embodiments. In some embodiments, the processing unit 130 may be configured to repeat a gain adjustment in a predetermined time interval, for example by resetting counters. As discussed herein, in some embodiments, the voltages corresponding to different sub-arrays may be adjusted independent of each other. For example, in the embodiment depicted in FIG. 1, a voltage V1 applied to the first photosensor region 121 may be adjusted independently of a voltage V2 applied to the second photosensor region 122. It may be noted that, alternatively or additionally, the voltage may be varied by an amount that estimates a magnitude of the peak shift, for example, by considering both the metric and the total counts observed by the windows. Varying the voltage by a predetermined step may improve stability of adjustment, while varying the voltage by an amount that considers the magnitude of the peak shift may improve the quickness of response.

Figure 6:
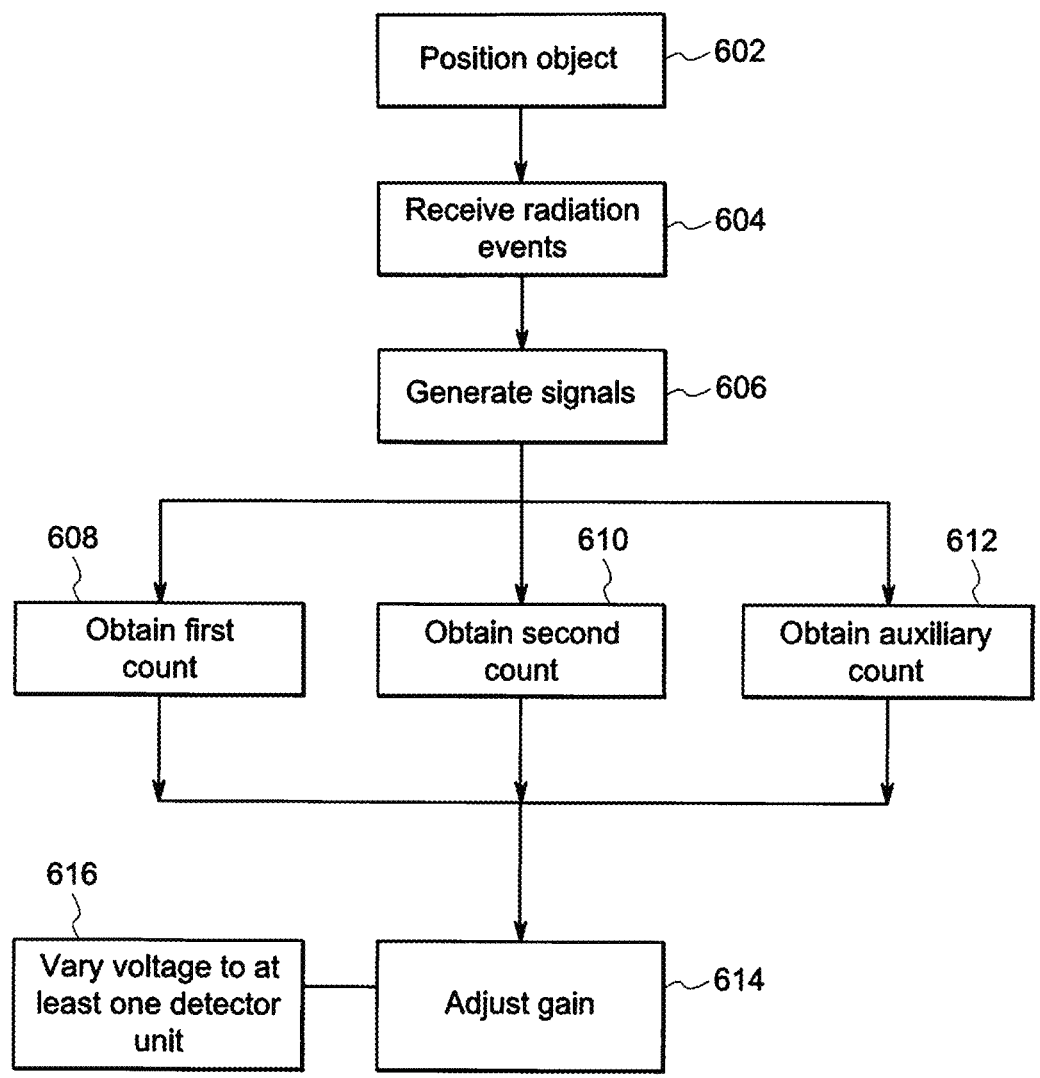
FIG. 6 is a flowchart of a method in accordance with various embodiments.

FIG. 6 provides a flowchart of a method 600 (e.g., for tracking an energy peak and/or adjusting a gain of a detection system) in accordance with various embodiments. The detection system, for example, may be configured for use with a PET imaging system. The method 600, for example, may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 600 may be used as one or more algorithms (e.g., software modules or other instructions stored on a tangible and non-transitory computer readable medium utilizing or based on the one or more algorithms) to direct hardware (e.g., processing unit 130 or portion thereof) to perform one or more operations described herein.

At 602, an object to be imaged is positioned within the field of view of a PET imaging system. The object, for example, may be a human patient that has been administered a radiopharmaceutical.

At 604, radiation events are received by at least one detector unit of the PET imaging system. The radiation events, for example, may be events caused by annihilation events within the human patient. Radiation from the patient may impact a crystal array of the at least one detector unit, which then emits light photons to one or more photosensors responsive to the radiation impact.

At 606, signals responsive to radiation events impacting the detector unit are generated. For example, photosensors receiving light photons may provide an electrical signal as an output responsive to reception of the light photons. A gain may be applied to the signals to calibrate the signals to a known or expected energy level of the radiation received from the object being imaged. Because the behavior of the detector unit or portions thereof may vary over time (e.g., due to temperature change), for accurate measurement, determination, and identification of radiation events the gain may be adjusted as discussed herein. As discussed herein, multiple signals (e.g., signals associated with individual blocks or units of a sub-array of a crystal array) may be combined (e.g., scaled and combined) to form a combined signal which is used to obtain counts for multiple windows. For example, signals corresponding to individual elements of the sub-array may be independently scaled based on a predetermined calibration. The signal may be represented as a histogram sorted by energy level in various embodiments.

At 608, a first count for at least one of the signals generated at 606 is obtained. The first count is for a first energy window corresponding to values higher than a nominal or target peak value (e.g., 511 keV). The first count may be obtained by adding the number of total counts from a histogram sorted by energy level that fall between upper and lower boundaries of the first energy window.

At 610, a second count for the at least one of the signals generated at 606 is obtained. The second count is for a second energy window corresponding to values lower than a nominal or target peak value (e.g., 511 keV). The second count may be obtained by adding the number of total counts from a histogram sorted by energy level that fall between upper and lower boundaries of the second energy window. In the case of a symmetric histogram centered about the peak, the first and second count windows may reliably and accurately be used to track the location of a peak relative to the nominal peak. However, in practice, the histograms generated during PET detection may not be symmetric, for example due to scatter or intrinsic radiation events, among others. Accordingly, as discussed herein, auxiliary windows may be used to address or account for asymmetries in an energy histogram to improve the accuracy and reliability of energy peak determination and/or tracking.

At 612, at least one auxiliary count for at least one of the signals generated at 606 is obtained. Each auxiliary count is for a corresponding auxiliary energy window. Auxiliary energy windows may be disposed below and/or above the nominal peak value. In some embodiments, a scatter window corresponding to scatter energy values may be used as an auxiliary energy window. Alternatively or additionally, an intrinsic window corresponding to intrinsic radiation energy values for the detector unit (or portions thereof such as a crystal array) may be used as an auxiliary window.

At 614, a gain applied to signals generated by the detector unit is adjusted based on the first count, the second count, and the at least one auxiliary count. For example, a peak tracking metric may be determined using the window counts. A weight may be applied to at least one of the window counts. For example, a weight may be applied to the at least one auxiliary count to determine the peak tracking metric. In some embodiments, it may then be determined if the peak tracking metric is within a predetermined range. For example, in some embodiments a peak tracking metric of zero may correspond to the peak value being at the nominal peak value, and it may be determined if the absolute value of the peak tracking metric exceeds a threshold. If the peak tracking metric is outside of the predetermined range, the gain may be adjusted (e.g., increased if the peak tracking metric is below the predetermined range, and decreased if the peak tracking metric is above the predetermined range. It may be noted that particular relationships between the counts used to obtain the peak tracking metric may be determined during a calibration of the detector unit (or during a calibration of a representative detector unit). In various embodiments, counts may be sampled over collection periods, with the peak tracking metric calculated for each collection period, and a running total of the peak tracking metric updated after each collection period. The running total of the peak tracking metric may be used to determine appropriate gain adjustment.

In some embodiments, the gain may be adjusted by varying a voltage. For example, at 616 of the illustrated embodiment, the voltage applied to at least one detector unit (e.g., a photosensor region of the detector unit) is varied. For example, the voltage may be varied by a predetermined step (e.g., a predetermined step increase applied if the peak is below a target range, or a predetermined step decrease applied if the peak is above the target range). It may be noted that, as discussed herein, gain may be adjusted other than by applying a voltage to the detector (e.g., by adjusting a gain of an amplifier, or by multiplying a digital representation of a received energy by a gain factor). It may be noted that other considerations may be accounted for in addition to the location of a peak tracking metric being outside a target range. For example, a conventional temperature based adjustment may be made additionally, with the conventional temperate based adjustment given priority over the peak tracking metric. Alternatively, the peak tracking metric may be given priority over the conventional temperature based adjustment. Further, limits may be placed on a number of gain adjustments made within a given amount of time, or frequency of gain adjustments. As another example, a series of signals may be obtained and analyzed, with the gain adjusted only if the series satisfies one or more predetermined criteria (e.g., a total amount of peak drift, a rate of peak drift, or the like). More recently obtained signals may be given a higher weighting than previously obtained signals in determining if the series of signals satisfies the predetermined criteria.

Figure 7:
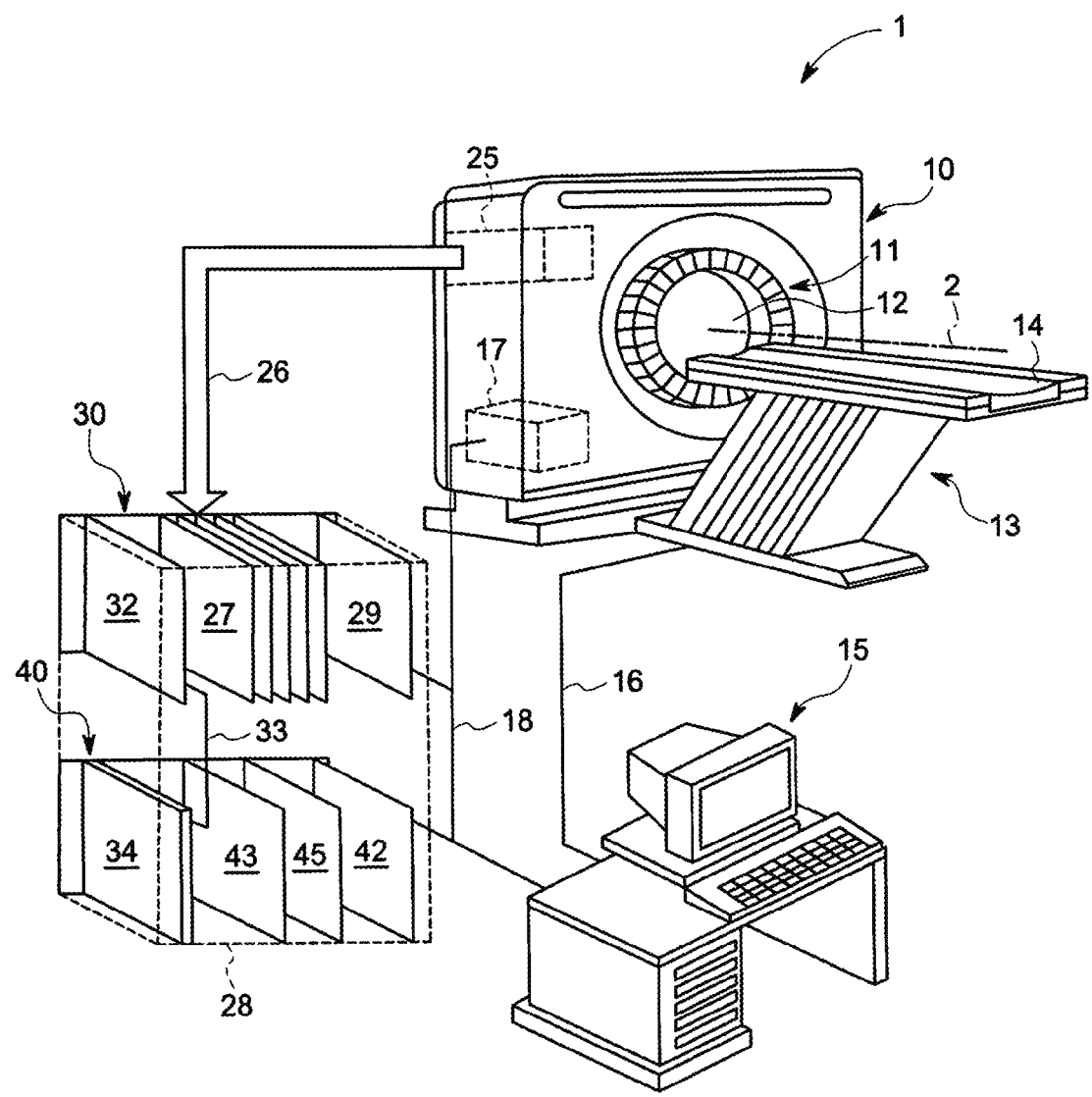
FIG. 7 illustrates an imaging system in accordance with various embodiments.
Figure 8:
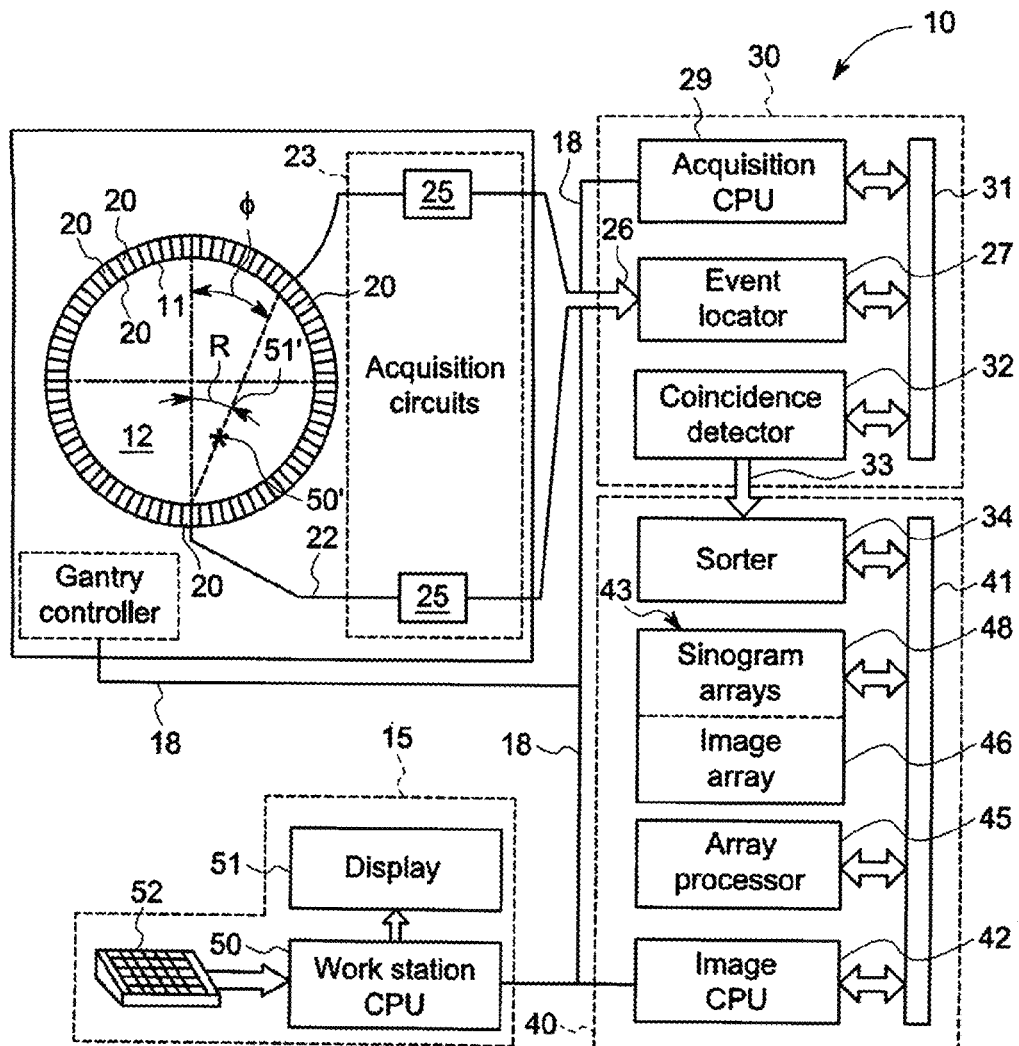
FIG. 8 is a schematic diagram of the imaging system of FIG. 7.
Figure 9:
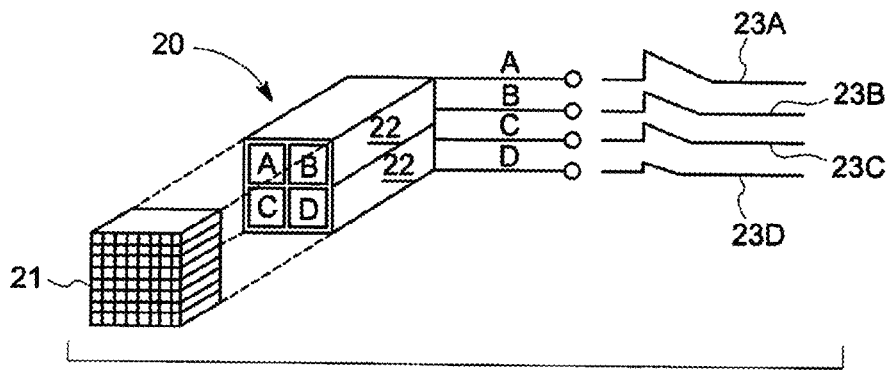
FIG. 9 illustrates an example of a detector module which forms part of the imaging system in accordance with various embodiments.

FIGS. 7-9 illustrate a PET imaging system with which various embodiments described herein may be employed. In other embodiments, crystal arrays as discussed herein may be utilized with other imaging systems (e.g., imaging systems configured for one or more additional or alternative modalities). FIG. 7 illustrates a PET scanning system 1 including a gantry 10 that supports a detector ring assembly 11 about a central opening or bore 12. The detector ring assembly 11 in the illustrated embodiments is generally circular and is made up of plural rings of detectors spaced along a central axis 2 to from a cylindrical detector ring assembly. In various embodiments, the detector ring assembly 11 may include 5 rings of detectors spaced along the central axis 2. A patient table 13 is positioned in front of the gantry 10 and is aligned with the central axis 2 of the detector ring assembly 11. A patient table controller (not shown) moves the table bed 14 into the bore 12 in response to commands received from an operator work station 15 through a communications link 16. A gantry controller 17 is mounted within the gantry 10 and is responsive to commands received from the operator work station 15 through a second communication link 18 to operate the gantry.

As shown in FIG. 8, the operator work station 15 includes a central processing unit (CPU) 50, a display 51, and a keyboard 52. An operator may use the keyboard to control the calibration of the PET scanner, the configuration of the PET scanner, and the positioning of the patient table for a scan. Also, the operator may control the display of the resulting image on the display 51 and/or perform image enhancement functions using programs executed by the work station CPU 50.

The detector ring assembly 11 includes a number of detector modules. For example, the detector ring assembly 11 may include 36 detector modules, with each detector module including eight detector blocks. An example of one detector block 20 is shown in FIG. 7. The detector blocks 20 in a detector module may be arranged, for example, in a 2×4 configuration such that the circumference of the detector ring assembly 11 is 72 blocks around, and the width of the detector assembly 11 is 4 detector blocks wide. Each detector block 20 may include a number of individual detector crystals. In the illustrated embodiment, the array of detector crystals 21 is situated in front of four photosensors 22. The photosensors 22 are depicted schematically as photomultiplier tubes; however, it may be noted that SiPM's may be employed in various embodiments. Other configurations, sized and numbers of detector crystals, photosensors and detector modules may be employed in various embodiments.

During a PET scan, an annihilation photon may impact one of the detector crystals 21. The detector crystal 21, which may be formed, for example of lutetium yttrium silicate (LYSO) or bismuth germinate (BGO), converts the annihilation photon into a number of photons which are received and detected by the photosensors. The photons generated by a detector crystal generally spread out to a certain extent and travel into adjacent detector crystals such that each of the four photosensors 22 receives a certain number photons as a result of an annihilation photon impacting a single detector crystal 21.

In response to a scintillation event, each photosensor 22 produces a signal 23A-23D on one of the lines A-D, as shown in FIG. 9, which rises sharply when a scintillation event occurs and then tails off exponentially. The relative magnitudes of the signals are determined by the position in the detector crystal array at which the scintillation event took place. The energy of the annihilation photon which caused the scintillation event determines the total magnitude of the four signals. The time that the signal begins to rise is determined by when the scintillation event occurs and the time required for photons to travel from the position of the scintillation event to the photosensors. The example depicted in FIG. 9 provides an example based on a vacuum photodetector; however, it may be noted that certain principles disclosed herein may also be applied to SiPM detectors generally.

As shown in FIG. 8, a set of acquisition circuits 25 is mounted within the gantry 10 to receive the four signals from the detector block 20. The acquisition circuits 25 determine timing, energy and the event coordinates within the array of detector crystals using the relative signal strengths. The results are digitized and sent through a cable 26 to an event locator circuit 27 housed in a separate cabinet 28. Each acquisition circuit 25 also produces an event detection pulse which indicates the exact moment the scintillation event took place.

The event locator circuits 27 form part of a data acquisition processor 30 which periodically samples the signals produced by the acquisition circuits 25. The data acquisition processor 30 has an acquisition CPU 29 which controls communications on the local area network 18 and a bus 31. The event locator circuits 27 assemble the information regarding each valid event into a set of digital numbers that indicated when the event took place and the identity of the detector crystal 21 which detected the event. The event locator circuits 27, for example, may use a detector position map to map a pair of coordinates to the detector 21 which detected the event.

The event data packets are transmitted to a coincidence detector 32 which is also part of the data acquisition processor 30. The coincidence detector 32 accepts the event data packets from the event locator circuits 27 and determines if any two of them are in coincidence. Coincidence is determined by a number of factors. For example, time markers in each event data packet may be required to be within a specified time period of each other, e.g., 4.57 ns. As another example, the locations indicated by the two event data packets may be required to lie on a straight line which passes through the field of view (FOV) of the scanner bore 12. Events which cannot be paired are discarded, but coincident event pairs are located and recorded as a coincidence data packet that is transmitted through a serial link 33 to a sorter 34. The format of the coincidence data packet may be, for example, a 48 bit data stream which includes, among other things, a pair of digital numbers that precisely identify the locations of the two detector crystals 21 that detected the event and the time difference between them.

The sorter 34, which may include a CPU and which forms part of an image reconstruction processor 40, receives the coincidence data packets from the coincidence detector 32. The function of the sorter 34 is to receive the coincidence data packets and allocate sinogram memory for the storage of the coincidence data. The set of all projection rays that point in the same direction (A) and pass through the scanner's field of view is a complete projection, or "view", a set of which makes a sinogram. The distance (R) between a particular projection ray and the center of the field of view locates that projection ray within the view. As shown in FIG. 6, for example, an event 50' occurs along a projection ray 51' which is located in a view at the projection angle θ and the distance R. The sorter 34 counts all of the events that occur on this projection ray (R, θ) during the scan by sorting out the coincidence data packets that indicate an event at the detector crystals 21 lying on the projection ray. During an emission scan, the coincidence counts are organized in memory 43, for example as a set of two-dimensional array, one for each axial image, and each having as one of its dimensions the projection angle θ and the other dimension the distance R. This θ by R map of the measured events may be referred to as sinogram array 48. The sorter 34 may also organize the coincidence events into other data formats. In a projection plane format, for example, other variables may be used to define coincidence events which are detected by pairs of detector crystals 21 in non-adjacent detector rings.

Coincidence events occur at random and the sorter 34 determines the θ and R values from the two crystal addresses in each coincidence data packet and increments the count of the corresponding sonogram array element. At the completion of the emission scan, the sinogram array 48 stores the total number of annihilation events which occurred along each ray. The array processor 45 reconstructs an image from the data in the sinogram array 48. First, however, a number of corrections may be made to the acquired data to correct for measurement errors such as those caused by attenuation of annihilation photons by the patient, detector gain non-uniformities, random coincidences, and integrator dead time. Each row of the corrected sinogram array is then Fourier transformed by the array processor 45 and multiplied by a one-dimensional filter array. The filtered data is then inverse Fourier transformed, and each array element is back projected to form the image array 46. The image CPU 42 may either store the image array data or output the data to the operator work station 15.

Certain previous embodiments discussed herein employ windows associated with a peak energy of received radiation. It may be noted that various embodiments may alternatively or additionally use windows disposed at other portions of a spectrum of energy detected by a detector. For example, various embodiments may employ a number of windows disposed at various points of the spectrum to provide gain adjustment based on a spectral shape or spectral signature. Such windows may or may not be associated with received energy. For example, in some embodiments, two or more windows may be disposed about a peak of intrinsic energy (e.g., radiation generated from within a detector, in distinction from radiation received by the detector from an outside source such as a human patient or other object being imaged).

For example, in some embodiments, the processing unit 130 may be configured to obtain, during an imaging process, a first count for at least one signal corresponding to a first intrinsic energy window and to obtain, during the imaging process, a second count for the at least one signal corresponding to a second intrinsic energy window. An imaging process as used herein may be understood as a process during which information for generating an image to be reconstructed is obtained. For the purposes of clarity and avoidance of doubt, an imaging process as used herein does not include use of a detector during a process in which no object to be imaged is analyzed. For example, a calibration process (e.g., a calibration process performed overnight or during another period when the detector is not being used for imaging) that is performed independent of imaging an object is not an imaging process as used herein. It may be noted that additional counts for additional windows may also be obtained and utilized in various embodiments. The first intrinsic energy window corresponds to values higher than an intrinsic peak value, and the second intrinsic energy window corresponds to values lower than the intrinsic peak value. The intrinsic peak, and associated counts, may be due to an intrinsic source within a detector unit (e.g., detector unit 105) such as Lutetium (e.g., Lu-176). It may be noted that other windows (e.g., windows associated with a different intrinsic peak and/or more than two windows associated with an intrinsic peak) may be used additionally or alternatively in various embodiments. The processing unit 130 in various embodiments adjusts a gain applied to signals (e.g., received and/or intrinsic signals) based on the first count and the second count. For example, a weighted sum may be used using the first count and the second count (and, in various embodiments, additional counts from additional windows), with the counts from each window being multiplied by a predetermined weighting factor before adding the counts for the weighted sum. For computing the weighted sum, counts for the particular windows may be accumulated for a given time period (e.g., one second), and the weighted sum re-calculated for the given time period. Alternatively, the weighted sum may be computed on an ongoing basis; in this case, each window has an associated weight, and when an event is determined to fall within a certain window, the corresponding weight is added to the running sum. Based on the value of the weighted sum, the gain is adjusted. For example, if the weighted sum is higher than a target value, the gain may be decreased, and if the weighted sum is lower than a target value, the gain may be increased. In the case of a running sum, the target value can be adjusted continuously, based on the number of counts received. For example, because of the random nature of the arrival of events of different energy, the weighted sum will slowly diverge from zero in a manner that follows a Gaussian random walk, where the expected deviation scales with the square root of the number of steps taken (or number of events detected). A criterion for adjusting gain may then be computed by evaluating the inequality $$S*S > f*N$$

Where S is the running sum, N is the total number of events, and f is some predetermined scale factor, for example 5. When the factor f is large, only large gain errors will result in an adjustment; when it is small, a small deviation will result in an adjustment. In order to improve stability of the algorithm, the accumulator N may be initialized to a value greater than zero (for example 200) when event accumulation begins; this will ensure that several hundred events will have to be detected before a gain adjustment is made.

It may be noted that the gain may be adjusted by adjusting a voltage supplied to the detector unit 105. Additionally, or alternatively, the gain may be adjusted virtually by adjusting measured values received from the detector unit. For example, if a 3% increase in gain is determined for the adjustment, received measured values may be multiplied by 1.03 to provide adjusted values for farther processing (e.g., use for image reconstruction).

In various embodiments, windows associated with intrinsic radiation as well as windows associated with received radiation may be utilized in determining a gain adjustment. For example, the processing unit 130 may be configured to (in addition to obtaining the first and second counts for the first and second intrinsic windows corresponding to an intrinsic portion of as signal) obtain counts corresponding to windows associated with a received energy peak (e.g., energy received due to radiation received from a patient being imaged having a nominal peak value for a known isotope) for at least one signal, and adjusting the gain based on the first count, the second count, and the counts for windows associated with the received energy peak. The particular number of windows, and weighting factors applied to the counts for the windows, may be tailored to suit the desired performance for a given embodiment. The weighting factors may be selected, for example, based on an anticipated or expected shape of an energy spectrum for a given detector, administered radiopharmaceutical, and/or imaging procedure.

It may be noted that windows associated with intrinsic radiation may be useful in providing improved accuracy or robustness of signal analysis for gain determination when radiation is received from an object to be imaged, as well as provide for gain adjustment and/or calibration when radiation is not received from an object to be imaged. For example, in some embodiments, the gain may be adjusted (e.g., by the processing unit 130) using the first count and the second count for counts otherwise associated with intrinsic radiation) during an initial start-up period (e.g., a period in which a patient is not within the bore of a detector and/or has not yet been administered a radiopharmaceutical, or during which the detector is otherwise not receiving radiation from an object to be imaged). Then, when a patient or other object is disposed within the bore, and the detector receives radiation from an external source (e.g., the patient or other object), the gain is adjusted using the first count and the second, as well as counts for windows associated with a received energy peak or portion of a signal).

Figure 10:
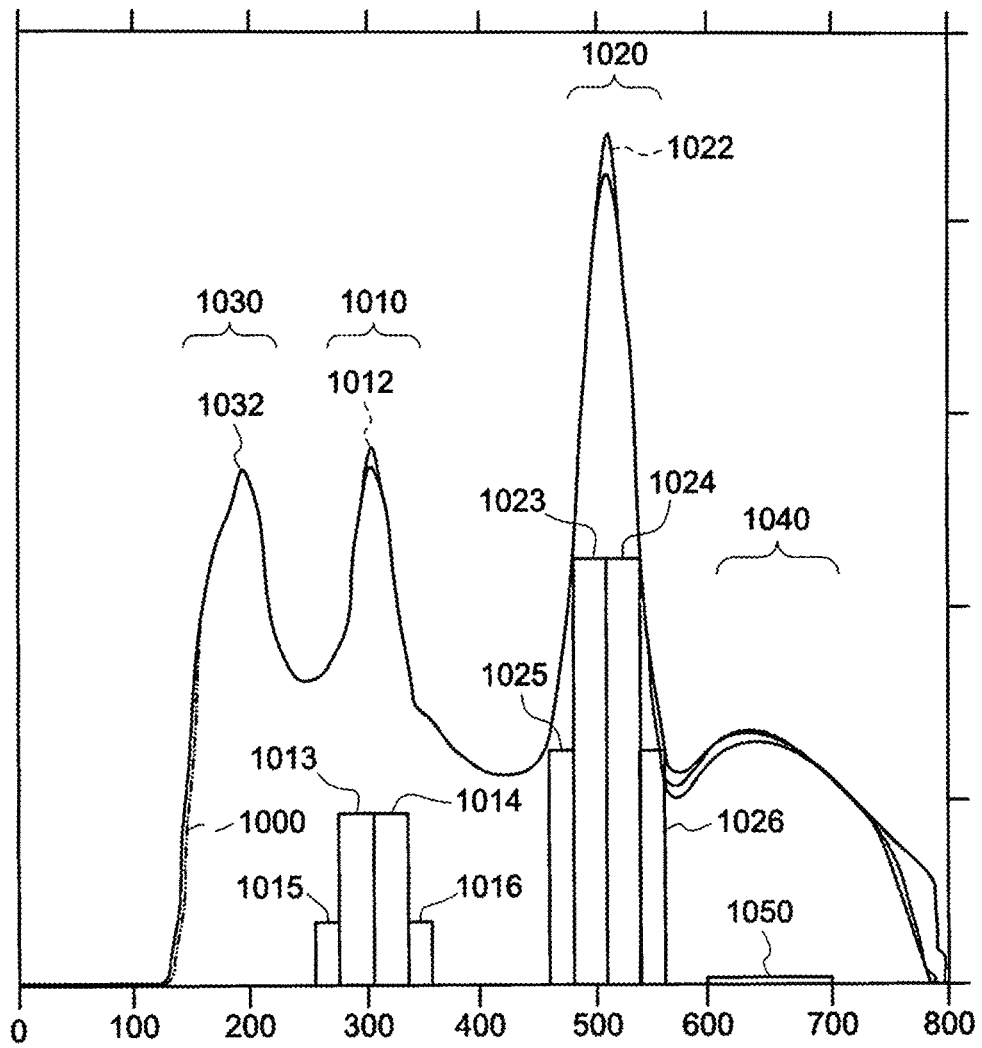
FIG. 10 depicts example windows used in connection with various embodiments.

FIG. 10 depicts an energy spectrum with example windows in accordance with various embodiments. The energy spectrum is plotted as a signal 1000 with a total number of counts of events (e.g., counts over a predetermined time period) along the vertical axis and energy of the events along the horizontal axis. As seen in FIG. 10, a signal 1000 includes a first intrinsic portion 1010 including a first intrinsic peak 1012 and a received radiation portion 1020 including a received radiation peak 1022. (It may be noted that different and/or additional peaks or portions may be present in other embodiments, for example, depending on detector material and/or radiopharmaceutical administered to a patient being imaged). For the example depicted in FIG. 10, the first intrinsic peak 1012 is at a nominal 307 keV (for Lu-176) and the received radiation peak 1022 is shown at a nominal 511 keV. It may be noted that a second intrinsic portion 1030 including a second intrinsic peak 1032 may be seen in the illustrated embodiment at a nominal 202 keV. Further, a third intrinsic portion 1040 is also shown in FIG. 10. It may be noted that the first intrinsic portion 1010 and the second intrinsic portion 1030 are at relatively lower energies with respect to the received radiation portion 1020, and the third intrinsic portion 1040 is at a relatively higher energy with respect to the received radiation portion 1020. It may be noted that the intrinsic portions correspond to radiation from within a detector (e.g., from within a crystal of the detector) or from a source that is not being imaged (e.g., a calibration source), whereas the received radiation portion corresponds to radiation received from an object being imaged.

For the embodiment depicted in FIG. 10, there are four windows associated with the first intrinsic portion 1010 of the signal 1000. A first intrinsic window 1013 and a second intrinsic window 1014 may be referred to as inner windows as they are more centrally located with respect to the first intrinsic peak 1012, and a third intrinsic window 1015 and fourth intrinsic window 1016 may be referred to as outer windows as they are more externally located with respect to the first intrinsic peak 1012 than the first intrinsic window 1013 and the second intrinsic window 1014.

An additional four windows are associated with the received radiation portion 1020 for the embodiment depicted in FIG. 10. A first received radiation window 1023 and a second received radiation window 1024 may be referred to as inner windows as they are more centrally located with respect to the received radiation peak 1022, and a third received radiation window 1025 and fourth received radiation window 1026 may be referred to as outer windows as they are more externally located with respect to the received radiation peak 1022 than the first received radiation window 1023 and the second received radiation window 1024.

The counts from each window are assigned a weight, with the counts from each window multiplied by the corresponding weight to provide a weighted count for each window. Then, the weighted count for all windows may be added to provide a weighted sum. Based on the weighted sum, the gain may be adjusted. For example, if the weighted sum is below a predetermined threshold (e.g., zero), the gain may be increased, and if the weighted sum is above a predetermined threshold (e.g., zero), the gain may be decreased. The particular values of weightings, number of windows, location of windows, size of windows, and thresholds employed for increasing or decreasing the gain may be varied to suit a given application, and may be determined and/or adjusted as part of a calibration process for a particular imaging system. It may be noted that the total number of windows used may be scaleable to be tuned to expected radiation levels for a given application.

The table below lists example weightings for the windows of FIG. 10 associated with the first intrinsic portion 1010 and received radiation portion 1020. It may be noted that the values in the table are provided by way of example and that other values may be employed in various embodiments.

| Window | Corresponding Signal Portion | Lower Boundary (keV) | Upper Boundary (keV) | Weighting Coefficient |
|---|---|---|---|---|
| Third intrinsic window 1015 | First intrinsic portion 1010 | 257 | 277 | 0.15 |
| First intrinsic window 1014 | First intrinsic portion 1010 | 277 | 307 | −(0.40) |
| Second intrinsic window 1014 | First intrinsic portion 1010 | 307 | 337 | 0.40 |
| Fourth intrinsic window 1016 | First intrinsic portion 1010 | 337 | 357 | −(0.15) |
| Third received radiation window 1025 | Received radiation portion 1020 | 461 | 481 | 0.55 |
| First received radiation window 1023 | Received radiation portion 1020 | 481 | 511 | −(1.0) |
| Second received radiation window 1024 | Received radiation portion 1020 | 511 | 541 | 1.0 |
| Fourth received radiation window 1026 | Received radiation portion 1020 | 541 | 561 | −(0.55) |

As discussed herein, a weighted sum may be generated using the number of counts and the weighting coefficients. This may be expressed as $S=(w_1*c_1)+(w_2*c_2)+(w_3*c_3)+\ldots$, where S is the weighted sum, $w_n$ is the count for the $n^{th}$ window, and $c_n$ is the weighting coefficient for the $n^{th}$ window. This may also be expressed as $$S=\Sigma_{i=1}^{n} w_i c_i$$

where n corresponds to the number of windows. It may be noted that the inner windows are more heavily weighted than the outer windows, and that the sign of the weighting factors alternates in the illustrated embodiment. Accordingly, events nearer the nominal peak tend to be weighted more heavily than events farther from the nominal peak. Also, events associated with received radiation tend to be weighted more heavily than events associated with intrinsic radiation (e.g., to allow for use of events associated with intrinsic radiation while still more heavily weighting received radiation to account for scatter leakage). The use of four windows in various embodiments provides a robust metric. For example, for a given received radiation peak, four windows may be sufficient to estimate the result of combined received radiation (e.g., the degree to which a peak differs from a nominal center such as 511 keV), scatter, and an intrinsic background. It may also be noted that, in the depicted example, the sign of the weighting coefficients alternates between adjacent windows. In various embodiments, use of such alternating positive and negative weighting coefficients with four or more windows about a peak may help account for a non-zero average slope of the signal in the area around the peak. For example, for an intrinsic peak, a relatively large amount of downscatter may occur as count rate increases. Weighting coefficients may be selected to help ensure that the downscatter does not result in a bias in the position of the peak. In some embodiments, the weighting coefficient associated with the intrinsic portion of the signal may be selected based on an assumption that the intrinsic peak is comprised of a symmetrical Gaussian shape imposed on top of a linear slope.

It may be noted that additional or alternative windows may be used in various embodiments, for example to fine tune the results in the case of high count rates (e.g., peak distortion due to pileup) and/or to correct for spillover from higher peaks (e.g., "dirty" radiotracers). For example, as seen in FIG. 10, an auxiliary window 1050 is disposed to the right of (or at a higher energy than) the received radiation portion 1020 to provide a total of 9 windows. In the illustrated embodiment, the auxiliary window 1050 is associated with the third intrinsic portion 1040 and is used to accumulate or count events associated with the third intrinsic portion 1040. In various embodiments, an additional or alternative auxiliary window may be employed to help account for "dirty" isotopes that may change the shape of the spectrum.

It may further be noted that, in an example scenario where the initial peak position of a given portion of a spectrum is too far removed from a nominal or expected correction (e.g., due to drift), the use of alternating signs between inner and outer windows may provide the resulted weighted sum with the wrong sign (e.g., in embodiments where a value above zero corresponds to a gain adjustment in one direction and a value below zero corresponds to a gain adjustment in an opposite direction), resulting in an inappropriate adjustment of gain in an incorrect direction. In various embodiments, if the peak is determined to not be appropriately centered on four (or more) associated windows, a different weighting scheme, or coarse adjustment scheme, may be used to estimate the direction of the correction; while if the peak is determined to appropriately centered, a fine adjustment weighting scheme (e.g., using weighting coefficients from the table above, with alternating signs) may be employed. In some embodiments, the coarse adjustment scheme may use the same windows as the fine adjustment scheme, but with different weighting coefficients. For example, the weighting coefficients for the first intrinsic window 1013 and third intrinsic window 1015 for a coarse adjustment scheme may be negative, and the weighting coefficients for the second intrinsic window 1014 and fourth intrinsic window 1015 for a coarse adjustment scheme may be positive (and/or the weighting coefficients for the first received radiation window 1023 and third received radiation window 1025 may be negative, and the weighting coefficients for the second received radiation window 1024 and fourth window 1025 may be positive), with the gain increased for a negative resulting weighted sum or decreased for a positive resulting weighted sum. In other embodiments, different windows may be employed for the coarse adjustment relative to the fine adjustment.

In various embodiments, the processing unit 130 may be configured to select an adjustment technique (e.g., fine adjustment or coarse adjustment) based on a peak analysis metric, which may be computed by the processing unit 130. The peak analysis metric in various embodiments is based on a weighted sum of windows around a given peak. The peak analysis metric in various embodiments provides an indication that there are more counts in the inner windows relative to the outer windows (e.g., that the peak is relatively centered about the four windows). For example, depending on their relative widths, the outer windows may receive a weighting coefficient of −(1.0) and the inner windows may receive a weighting coefficient of 1.0. The peak analysis metric is then computed using one or more weighted sums. For example, the peak analysis metric may be computed using $P=(\Sigma(w_i*x_i))/(\Sigma(|w_i|*x_i))$, where P is the peak analysis metric, $w_i$ is the weighting coefficient for a given window and xi is the number of counts for the given window. A positive result for P indicates more counts in the inner windows (e.g., the peak is centered and the fine adjustment scheme used), and a negative result indicating more counts in the outer windows (e.g., the peak is not centered and the coarse adjustment scheme used). In some embodiments, a value of P as 0.25 may be employed as a threshold, with the signal considered on peak when P is above 0.25. It may be noted that other metrics and/or other thresholds may be used in alternate embodiments for determining which adjustment technique to employ. In some embodiments, when it is determined that the gain determined by the fine adjustment technique is in an inappropriate direction, the processing unit 130 may automatically adjust the gain in the opposite direction to that determined. Such an adjustment in the opposite direction may be in a smaller increment than called for by the original determination.

In some embodiments, a running count of 3 accumulators (or weighted sums) may be kept—a first weighted sum for a fine adjustment technique, a second weighted sum for a coarse adjustment technique, and a peaking weighted sum for determining which of the fine adjustment technique or coarse adjustment technique to use.

In some embodiments, for example to help prevent changes in gain from occurring too rapidly, the statistical significance of an accumulated signal (and/or associated counts) may be determined. Then, depending on the significance of a gain adjustment metric or calculation, it may be determined whether or not to adjust the gain. Accordingly, in various embodiments, the processing unit 130 is configured to determine a stability metric, and to determine whether or not to adjust the gain based on the stability metric. By comparing the evolution of such a metric over time when the spectrum is on-peak compared to when the spectrum was off-peak in various embodiments, it was found that the metric may grow in proportion with the square root of the number of counts, and that, for a peak shift, the metric may grow linearly. Accordingly, with appropriately selected coefficients A and B, the following inequality may be employed as a stability metric: $(acc)^2>A*N+B$, where acc is an accumulated count (e.g., a weighted sum) for a given accumulation period and N is a number of accumulation periods (e.g., number of accumulation periods since a gain adjustment). However, it may be noted that a shift in counts that is significant may be masked by a sufficiently high number of accumulation periods N. Accordingly, a very small gain adjustment and re-setting of N to zero may be periodically performed. For example, if a number of counts or periods occurs without any gain adjustment, a small gain adjustment (e.g., a smaller adjustment than made for adjustments called for by a spectral analysis of the signal) may be made (e.g., an adjustment of 0.1%).

Figure 11:
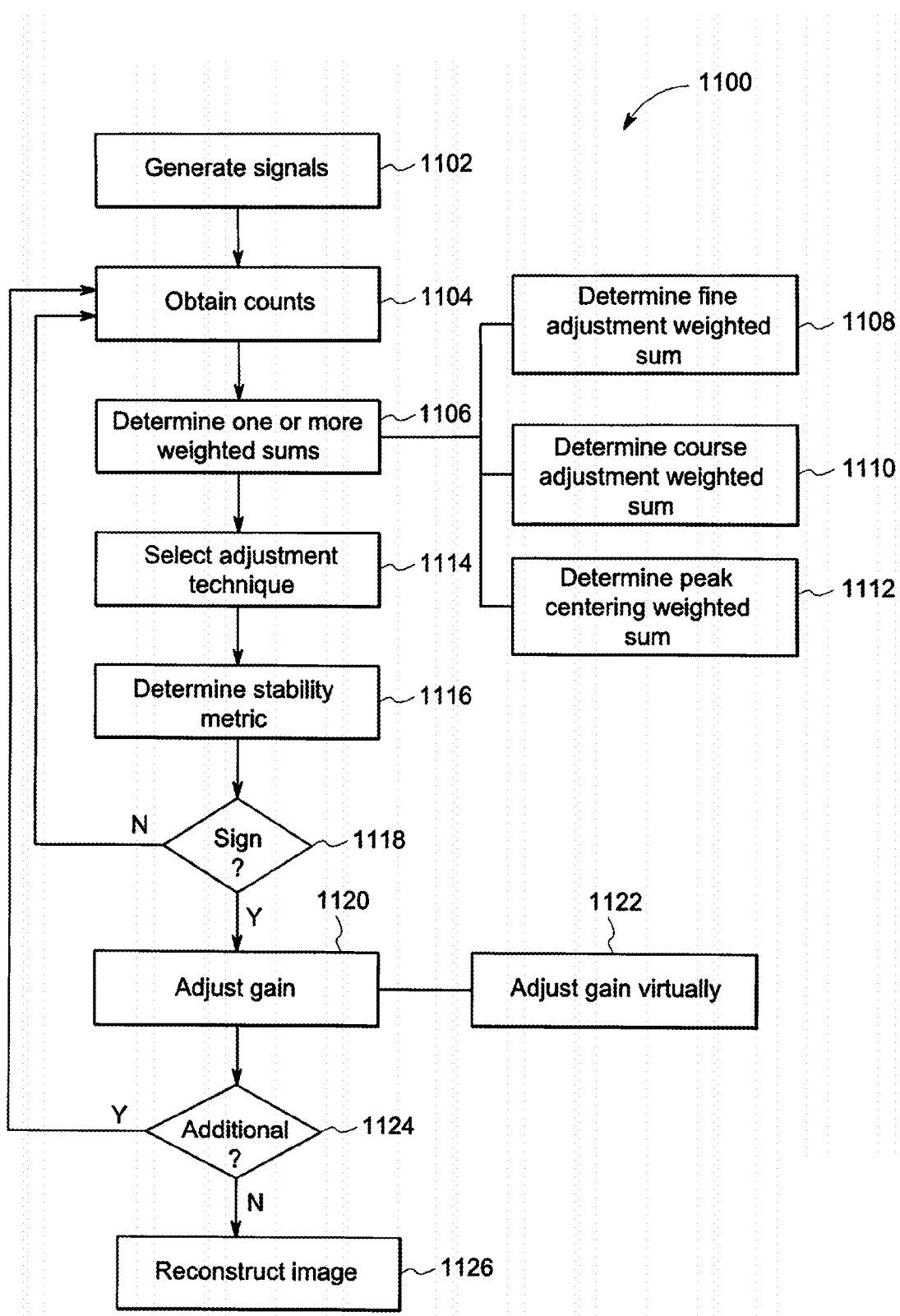
FIG. 11 is a flowchart of a method in accordance with various embodiments.

FIG. 11 provides a flowchart of a method 1100 (e.g., for tracking an energy peak and/or adjusting a gain of a detection system) in accordance with various embodiments. The detection system, for example, may be configured for use with a PET imaging system. The method 1100, for example, may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1100 may be used as one or more algorithms (e.g., software modules or other instructions stored on a tangible and non-transitory computer readable medium utilizing or based on the one or more algorithms) to direct hardware (e.g., processing unit 130 or portion thereof) to perform one or more operations described herein.

At 1102, signals are generated with a detector unit. The signals may include intrinsic events (caused by radiation within the detector) and/or received radiation events (caused by radiation from outside of the detector, such as an object to be imaged). An individual signal or group of counts of events may be generated or accumulated over a predetermined accumulation period (e.g., 1 second). For example, a first group of counts may be characterized by the number of counts at particular energy levels over an initial time period, a second group of counts may be characterized by the number of counts at particular energy levels over a subsequent time period, and so on.

At 1104, counts are obtained for windows distributed about an energy spectrum. For example, as discussed in connection with 1102, a signal may be characterized by numbers of counts at particular energy levels. Windows may be positioned along the spectrum, with each window defining a range of energy levels, and a separate accumulation of counts performed for each window over an accumulation period (e.g., one second). The windows may be disposed along the spectrum at locations corresponding to different portions of an expected or nominal signal. For example, in some embodiments four windows may be disposed proximate an intrinsic portion of the signal, and four windows disposed proximate a received radiation portion of the signal. (See FIG. 10 and related discussion.) The use of such windows disposed along different portions of an energy spectrum may provide information regarding a spectral signature or shape of a signal, and provide more information than just an identification of a peak location. Additionally or alternatively, one or more auxiliary windows may be utilized in various embodiments. It may be noted that the counts may be obtained in various embodiments for differently sized portions of a detector. For example, counts may be obtained for a single crystal in some embodiments or for a block of crystals in other embodiments. Generally speaking, the more crystals or other units for which counts are collected, the shorter the accumulation period may be to collect a statistically significant number of counts. Further, additionally or alternatively, gain adjustments may be made for differently sized or apportioned units of a detector, such as a single crystal or a block of crystals. Accordingly, gain may be independently adjusted based on a local condition for subportions of a detector.

At 1106, one or more weighted sums are determined. Generally, a weighted sum may be determined for a given accumulation period by multiplying the accumulated counts for each window by a predetermined weighting coefficient corresponding to the particular window. In the depicted embodiment, three weighted sums are determined. It may be noted that in various embodiments, individual events may be independently weighted first and then added to a running accumulator. Additionally, in various embodiments, a running count of total events seen may be kept (e.g., for use in connection with stability metric). At 1108, a fine adjustment weighted sum is determined. For the fine adjustment weighted sum, in some embodiments, groups of four windows are disposed about one or more nominal peak energy levels. The inner windows may have larger weighting coefficients than the outer windows for each group of four windows, and the signs of the weighting coefficients may alter between positive and negative between adjacent windows. At 1108, a coarse adjustment weighted sum is determined. For the coarse adjustment weighted sum, in some embodiments, one or more windows on one side of a nominal peak are assigned a negative weighting coefficient, and one or more windows on an opposite side of the nominal peak are assigned a positive weighting coefficient. At 1112, a peak centering weighted sum is determined. The peak centering weighted sum is an example of a peak analysis metric that may be used to determine whether or not a measured peak is relatively centered about a group of windows disposed about a nominal peak, and/or the relative quality or amount of centering. In some embodiments, where four windows are disposed about a nominal peak, for the peak centering weighted sum, the inner windows may have positive sign weighting coefficients and the outer windows negative sign weighting coefficients. The peak centering weighted sum, for example, may be used to select between which of the fine adjustment or the coarse adjustment will be used to adjust a gain (or determine if a gain adjustment is appropriate).

At 1114, an adjustment technique is selected. In the depicted example, a peak analysis metric (e.g., the peak centering weighted sum determined at 1112) is used to select the adjustment technique. For example, if the peak centering adjustment weighted sum satisfies or exceeds a given threshold (indicating that the measured peak is relatively well centered with respect to the corresponding group of windows), a fine adjustment technique (e.g., using the fine adjustment weighted sum) may be selected. However, if the peak centering adjustment weighted sum does not satisfy or exceed the given threshold (indicating that the measured peak is not relatively well centered with respect to the corresponding group of windows), a coarse adjustment technique (e.g., using the coarse adjustment weighted sum) may be selected.

At 1116, a stability metric is determined. Generally, the stability metric is configured and used to determine the significance of a determined gain adjustment metric or calculation, and determine whether or not to adjust the gain based on the significance of the determined adjustment. The stability metric may be determined using a determined gain adjustment provided by using the technique selected at 1114. In the depicted embodiment, at 1118, if the stability metric indicates the adjustment is not significant, then the adjustment may not be made, and the process may return to 1104 to obtain counts for a subsequent accumulation period. Further, if a predetermined number of events (for example, 16000) has been detected without a significant value in the stability metric, then a very small gain adjustment (for example, ±0.1%) may be made based on the sign of the stability metric, after which all counters will be reset. In this manner, the control system remains sensitive to sudden gain changes. Without such a mechanism, if the detector had been stable for a long time, it would take significant time for the stability metric to become sufficiently large to generate an adjustment if a sudden gain change should occur due to a change in count rate, temperature, supply voltage or other external factor.

If the adjustment is determined to be significant, the method may proceed to 1120, with the gain adjusted at 1120. It may be noted that the gain may be adjusted by adjusting a voltage supplied to the detector (e.g., a voltage supplied to a particular block of the detector), or may be adjusted virtually in firmware or software. For example, in the illustrated embodiments, at 1122, the gain is adjusted virtually by adjusting the values of measured or detected energy levels received from a detector unit.

Additional events may be acquired and analyzed, with appropriate adjustments made to the gain during an imaging process as discussed herein. Events may be passed along for image processing after they are analyzed. Generally, after a gain adjustment is made, that particular gain value will be utilized for subsequent events until another gain adjustment is determined appropriate as discussed herein. At 1126, an image is reconstructed using information collected during the scan.

Figure 12:
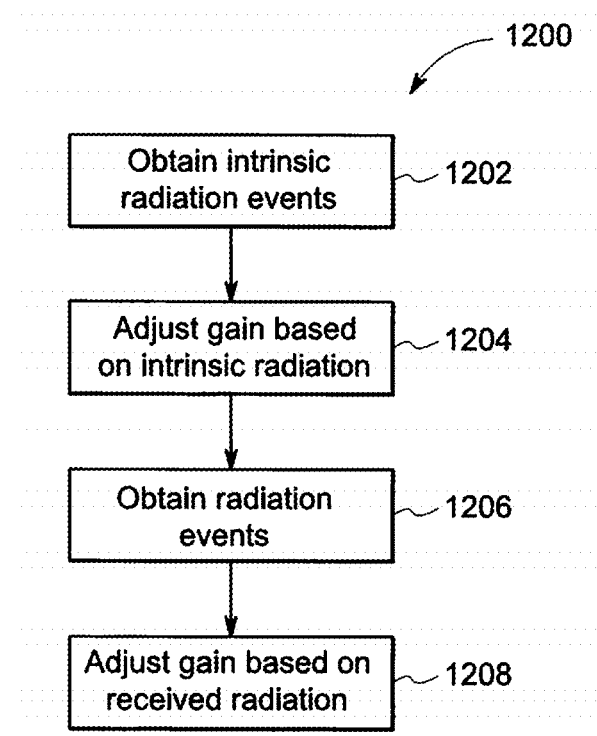
FIG. 12 is a flowchart of a method in accordance with various embodiments.

FIG. 12 provides a flowchart of a method 1200 (e.g., for tracking an energy peak and/or adjusting a gain of a detection system) in accordance with various embodiments. The detection system, for example, may be configured for use with a PET imaging system. The method 1200, for example, may employ, include, or relate to structures or aspects of various embodiments discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method 1200 may be used as one or more algorithms (e.g., software modules or other instructions stored on a tangible and non-transitory computer readable medium utilizing or based on the one or more algorithms) to direct hardware (e.g., processing unit 130 or portion thereof) to perform one or more operations described herein.

At 1202, intrinsic radiation events from a detector are obtained. The intrinsic radiation events may be obtained during an initial start-up period of a detector. For example, an imaging system may be activated, but an object to be imaged may not yet be present in the field of view of the detector. Accordingly, radiation counts obtained via the detector may correspond to intrinsic radiation, with little or no radiation detected from a surrounding environment.

At 1204, the gain is adjusted based on the intrinsic radiation. For example, an obtained signal may be compared with an expected or nominal signal and the gain adjusted so that the shape of the spectrum of the obtained signal more closely matches the expected shape of the spectrum of the expected or nominal signal based on known intrinsic radiation sources within the detector (e.g., Lu-176). Using various embodiments of gain adjustment disclosed herein, it has been found that a gain adjustment may effectively adjust the measured signal to sufficiently track the expected or nominal signal within ten seconds or less for initial gain errors up to 10%, and using only intrinsic radiation. Accordingly, a gain may be efficiently and quickly adjusted for improved accuracy at the beginning of a scan when an object to be imaged is first introduced into the field of view of a detector.

At 1206, radiation events are obtained from the detector. For example, a patient that has been administered a radiopharmaceutical may be placed within the field of view of the detector. Accordingly, radiation events (along with the intrinsic events) may be accumulated and used to determine a gain adjustment as discussed herein.

At 1208, the gain is adjusted based on the received radiation. The gain may be adjusted based on the received radiation events as well as intrinsic radiation events acquired contemporaneously with the received radiation events. For example, as discussed herein, a gain adjustment may be determined based on a weighted sum of counts accumulated by windows associated with intrinsic and received radiation portions of an energy spectrum.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and the like. The storage device may also be other similar means for loading computer programs or other instructions into the computer or processor.

As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuitry capable of executing the functions described herein. The above examples are exemplary only, and are thus not intended to limit in any way the definition and/or meaning of the term "module" or "computer."

The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the invention without departing from their scope. While the dimensions and types of materials described herein are intended to define the parameters of the various embodiments of the invention, the embodiments are by no means limiting and are exemplary embodiments. Many other embodiments will be apparent to those of skill in the art upon reviewing the above description. The scope of the various embodiments of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A radiation detection system comprising:
    a detector unit comprising a scintillator block and a photosensor, the detector unit configured to generate signals responsive to radiation; and
    at least one processor operably coupled to the detector unit and configured to receive the signals from the detector unit, the at least one processor configured to:
        obtain, during an imaging process, at least a first count for at least one of the signals corresponding to a first intrinsic energy window, the first energy window corresponding to values higher than an intrinsic peak value;
        obtain, during the imaging process, at least a second count for the at least one of the signals corresponding to a second intrinsic energy window, the second energy window corresponding to values lower than the intrinsic peak value; and
        adjust a gain applied to the signals based on at least the first count and the second count.

2. The radiation detection system of claim 1, wherein the at least one processor is further configured to:
    obtain received radiation counts for the at least one of the signals corresponding to windows associated with a received energy portion of the at least one of the signals; and
    adjust the gain based on the first count, the second count, and the received radiation counts for the windows associated with the received energy portion.

3. The radiation detection system of claim 1, wherein the at least one processor is further configured to:
    obtain a third count for the at least one of the signals corresponding to a third intrinsic energy window;
    obtain a fourth count for the at least one of the signals corresponding to a fourth intrinsic energy window;
    obtain a fifth count for the at least one of the signals corresponding to a first received energy window;
    obtain a sixth count for the at least one of the signals corresponding to a second received energy window;
    obtain a seventh count for the at least one of the signals corresponding to a third received energy window;
    obtain an eighth count for the at least one of the signals corresponding to a fourth received energy window; and
    adjust the gain applied to the signals based on a weighted sum of the first count, the second count, the third count, the fourth count, the fifth count, the sixth count, the seventh count, and the eighth count.

4. The radiation detection system of claim 2, wherein the at least one processor is further configured to:
    obtain an auxiliary count for the at least one of the signals corresponding to an auxiliary window;
    adjust the gain based on the first count, the second count, and the auxiliary count.

5. The radiation detection system of claim 2, wherein the at least one processor is further configured to:
    adjust the gain using the first count and the second count during an initial start-up period; and
    adjust the gain using the first count, the second count, and the counts for the windows associated with the received energy peak during an imaging period.

6. The radiation detection system of claim 2, wherein the at least one processor is configured to select an adjustment technique based on a peak analysis metric, wherein the peak analysis metric is based on a weighted sum of windows around a given peak.

7. The radiation detection system of claim 6, wherein the at least one processor is configured to select between a coarse adjustment technique and a fine adjustment technique.

8. The radiation detection system of claim 1, wherein the at least one processor is configured to adjust the gain virtually by adjusting measured values received from the detector unit.

9. The radiation detection system of claim 1, wherein the at least one processor is configured to determine a stability metric, and to determine whether or not to adjust the gain based on the stability metric.

10. A method comprising:
generating signals, with a detector unit, responsive to radiation;
obtaining, with at least one processor, during an imaging process, a first count for at least one of the signals corresponding to a first intrinsic energy window, the first energy window corresponding to values higher than an intrinsic peak value;
obtaining, with the at least one processor, during the imaging process, a second count for the at least one of the signals corresponding to a second intrinsic energy window, the second energy window corresponding to values lower than the intrinsic peak value; and
adjusting a gain applied to the signals based on at least the first count and the second count.

11. The method of claim 10, further comprising:
obtaining received radiation counts for the at least one of the signals corresponding to windows associated with a received energy portion of the at least one of the signals; and
adjusting the gain based on the first count, the second count, and the received radiation counts for the windows associated with the received energy portion.

12. The method of claim 11, further comprising:
adjusting the gain using the first count and the second count during an initial start-up period; and
adjusting the gain using the first count, the second count, and the counts for the windows associated with the received energy peak during an imaging period.

13. The method of claim 11, further comprising selecting an adjustment technique based on a peak analysis metric, wherein the peak analysis metric is based on a weighted sum of windows around a given peak.

14. The method of claim 13, further comprising selecting between a coarse adjustment technique and a fine adjustment technique.

15. The method of claim 10, wherein the gain is adjusted virtually by adjusting measured values received from the detector unit.

16. The method of claim 10, further comprising determining a stability metric, and determining whether or not to adjust the gain based on the stability metric.

17. A tangible and non-transitory computer readable medium comprising one or more software modules configured to direct one or more processors to:
generate signals, with a detector unit, responsive to radiation;
obtain, during an imaging process, a first count for at least one of the signals corresponding to a first intrinsic energy window, the first energy window corresponding to values higher than an intrinsic peak value;
obtain, during an imaging process, a second count for the at least one of the signals corresponding to a second intrinsic energy window, the second energy window corresponding to values lower than the intrinsic peak value; and
adjust a gain applied to the signals based on at least the first count and the second count.

18. The tangible and non-transitory computer readable medium of claim 17, wherein the one or more software modules are further configured to direct the one or more processors to:
obtain counts for the at least one of the signals corresponding to windows associated with a received energy portion of the at least one of the signals; and
adjust the gain based on the first count, the second count, and the counts for the windows associated with the received energy portion.

19. The tangible and non-transitory computer readable medium of claim 17, wherein the one or more software modules are further configured to direct the one or more processors to:
adjust the gain virtually by adjusting measured values received from the detector unit.

20. The tangible and non-transitory computer readable medium of claim 17, wherein the one or more software modules are further configured to direct the one or more processors to:
determine a stability metric; and
determine whether or not to adjust the gain based on the stability metric.

* * * * *